US012563172B1

(12) United States Patent
Strandborg et al.

(10) Patent No.: US 12,563,172 B1
(45) Date of Patent: Feb. 24, 2026

(54) ON-THE-FLY AUTOMATED CALIBRATION OF MULTISCOPIC DISPLAYS

(71) Applicant: Distance Technologies Oy, Helsinki (FI)

(72) Inventors: Mikko Strandborg, Hangonkylä (FI); Petteri Timonen, Helsinki (FI); Tuomas Lukka, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/258,260

(22) Filed: Jul. 2, 2025

Related U.S. Application Data

(63) Continuation-in-part of application No. 19/190,945, filed on Apr. 28, 2025, now Pat. No. 12,388,971.

(51) Int. Cl.
*H04N 13/327* (2018.01)
*H04N 13/324* (2018.01)
*H04N 13/366* (2018.01)

(52) U.S. Cl.
CPC ......... *H04N 13/327* (2018.05); *H04N 13/324* (2018.05); *H04N 13/366* (2018.05)

(58) Field of Classification Search
CPC ... H04N 13/327; H04N 13/324; H04N 13/366

USPC .......................................................... 348/51
See application file for complete search history.

(56) References Cited

U.S. PATENT DOCUMENTS

| | | | |
|---|---|---|---|
| 2017/0177075 A1* | 6/2017 | Zhang | G02B 27/0172 |
| 2018/0348861 A1* | 12/2018 | Uscinski | A63F 13/211 |
| 2020/0128231 A1* | 4/2020 | Pace | H04N 13/383 |

\* cited by examiner

*Primary Examiner* — Behrooz M Senfi
(74) *Attorney, Agent, or Firm* — Ziegler IP Law Group, LLC.

(57) ABSTRACT

An optical location of each eye of user(s) relative to a display area of a multiscopic display is determined using a tracker. An optical location of camera(s) relative to the display area is determined or retrieved. An initial estimated value of parameter(s) of a multiscopic optical element of the multiscopic display is selected. A multiscopic image to be displayed via the multiscopic display, is generated, based on the initial estimated value of the parameter(s) and the optical location of each eye of the user(s). The multiscopic image is displayed via the multiscopic display, whilst image(s) of the display area is/are captured using the camera(s). A refined estimated value of the parameter(s), is determined, based on the captured image(s), the multiscopic image, the initial estimated value of the parameter(s), and the optical location of the camera(s).

17 Claims, 5 Drawing Sheets

310a          310b          310c 310d          310e          310f

ON-THE-FLY AUTOMATED CALIBRATION OF MULTISCOPIC DISPLAYS

CROSS-REFERENCE TO RELATED APPLICATIONS

This application is a continuation-in-part of U.S. patent application Ser. No. 19/190,945, titled "AUTOMATED CALIBRATION OF MULTISCOPIC DISPLAYS" filed on Apr. 28, 2025, which is incorporated herein by reference.

TECHNICAL FIELD

The present disclosure relates to systems for on-the-fly automated calibration of multiscopic displays. The present disclosure also relates to methods for on-the-fly automated calibration of multiscopic displays.

BACKGROUND

Multiscopic displays are widely used in applications such as three-dimensional (3D) visualisation, augmented reality (AR), virtual reality (VR), and automotive heads-up displays (HUDs). A multiscopic display often relies on a precise alignment between a multiscopic optical element (for example, a lenticular array or a parallax barrier) of the multiscopic display and an underlying pixel array of the multiscopic display to present high-quality images to different eyes of a user.

However, calibration of such multiscopic displays is a critical and challenging process. Typically, the calibration of the multiscopic displays is performed manually, requiring skilled operators to determine an angular alignment of the multiscopic optical element with respect to the pixel array. This process is time-consuming, labour-intensive, and prone to human error. Additionally, the calibration tends to drift over time due to factors such as thermal expansion, mechanical stress, or environmental changes, necessitating frequent re-calibration to maintain optimal performance of the multiscopic displays. Furthermore, existing techniques for calibrating the multiscopic displays cause interruptions during normal operation of the multiscopic displays.

Some existing techniques for calibrating the multiscopic displays utilise test patterns and manual adjustments. For example, operators visually inspect interference patterns caused by a misalignment between the multiscopic optical element and the underlying pixel array, and adjust settings of the multiscopic optical element accordingly. While this approach can achieve acceptable results, it is not scalable for mass production or real-time re-calibration in dynamic environments. Additionally, such manual calibration lacks the precision required for advanced applications, such as automotive displays or AR/VR systems, where even minor misalignments results in significant visual artifacts, such as crosstalk, ghosting, or incorrect depth perception, which deteriorates an overall viewing experience of users.

Therefore, in light of the foregoing discussion, there exists a need to overcome the aforementioned drawbacks.

SUMMARY

The present disclosure seeks to provide a system and a method for on-the-fly automated calibration of a multiscopic display. The aim of the present disclosure is achieved by a system and a method which enable continuous, real-time, on-the-fly automated calibration of a multiscopic display (i.e., automatic calibration being performed during a normal operation of the multiscopic display while at least one user is actively viewing virtual content), by iteratively determining a refined estimated value at least one parameter (for example, such as a pitch, an orientation, a phase, and/or a thickness) of a multiscopic optical element of the multiscopic display. This eliminates manual intervention and ensures significantly high accuracy, scalability, and reliability of the multiscopic display during its operation, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3C illustrates simplified examples of interference patterns generated corresponding to a direct view of the display area, while

DETAILED DESCRIPTION OF EMBODIMENTS

Figure 1:
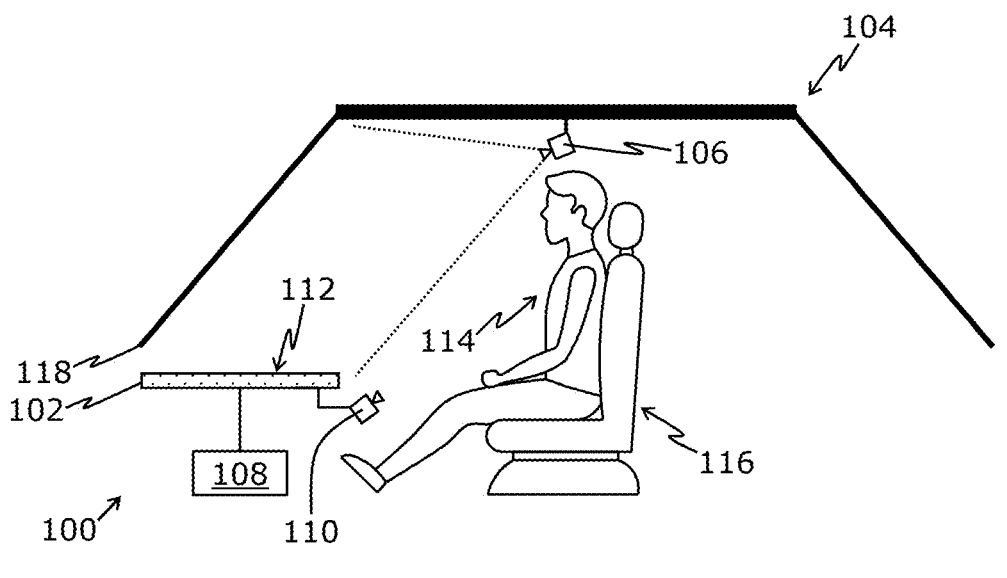
FIG. 1 illustrates a simplified example implementation of a system for on-the-fly automated calibration of a multiscopic display, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  a tracker;
  a multiscopic display;
  at least one camera that is positioned such that a display area of the multiscopic display lies at least partially within a field of view of the at least one camera; and

at least one processor configured to:

determine an optical location of each eye of at least one user relative to the display area, using the tracker;

determine or retrieve an optical location of the at least one camera relative to the display area;

select an initial estimated value of at least one parameter of a multiscopic optical element of the multiscopic display;

generate a multiscopic image to be displayed via the multiscopic display, based on the initial estimated value of the at least one parameter and the optical location of each eye of the at least one user;

display the multiscopic image via the multiscopic display, whilst capturing at least one image of the display area using the at least one camera; and determine a refined estimated value of the at least one parameter of the multiscopic optical element, based on the at least one captured image, the multiscopic image, the initial estimated value of the at least one parameter, and the optical location of the at least one camera.

In a second aspect, an embodiment of the present disclosure provides a method comprising:

determining an optical location of each eye of at least one user relative to a display area of a multiscopic display, using a tracker;

determining or retrieving an optical location of at least one camera relative to the display area, wherein the at least one camera is positioned such that the display area at least partially within a field of view of the at least one camera;

selecting an initial estimated value of at least one parameter of a multiscopic optical element of the multiscopic display;

generating a multiscopic image to be displayed via the multiscopic display, based on the initial estimated value of the at least one parameter and the optical location of each eye of the at least one user;

displaying the multiscopic image via the multiscopic display, whilst capturing at least one image of the display area using the at least one camera; and determining a refined estimated value of the at least one parameter of the multiscopic optical element, based on the at least one captured image, the multiscopic image, the initial estimated value of the at least one parameter, and the optical location of the at least one camera.

The present disclosure provides the aforementioned system and the aforementioned method that offer several technical benefits over the prior art in terms of calibrating multiscopic displays. First, unlike existing manual calibration techniques that are time-consuming and require operator skill, the system and the method of the present disclosure automatically determine the refined estimated value of the at least one parameter (for example, such as a pitch, an orientation, a thickness, and/or a phase) of the multiscopic optical element by analysing the at least one captured image, the multiscopic image, the initial estimated value of the at least one parameter, and the optical location of the at least one camera, thereby eliminating the need for human intervention. This results in significant reduction of calibration time and improved accuracy, even in scenarios where calibration drifts over time due to factors, for example, such as a thermal expansion of the multiscopic display, the multiscopic display being exposed to a mechanical stress, and the like. Second, by eliminating the need for human intervention, the system and the method ensure a scalable and repeatable calibration process. Third, the system and the method leverage software-based corrections, offering exceptional flexibility to accommodate a wide range of display configurations for calibration purposes. Fourth, the system and the method does not rely on explicit calibration patterns, and enables continuous or real-time calibration during user-directed display of virtual content (namely, while the at least one user is actively viewing virtual content). Fifth, the system and the method are susceptible to achieve the aforesaid technical benefits with minimal hardware requirements. For example, an existing tracking camera can be utilised for an image capturing operation and any standard processor can be used for executing processing steps of the method, thereby eliminating the need for any specialised hardware. This also reduces costs and simplifies a practical implementation of the system, making it accessible for diverse applications, for example, such as automotive heads-up displays, augmented-reality displays, and the like. Together, these technical benefits provide a robust, cost-effective, and fully-automated real time calibration solution, improving the reliability, scalability, usability, and performance of the multiscopic displays, whilst reducing their operational complexity.

It will be appreciated that it is important to calibrate the multiscopic displays because their performance and visual quality output depend heavily on a value of the at least one parameter of the multiscopic optical element. Using an incorrect value of the at least one parameter during generation of the multiscopic image can result into visual artifacts such as interference patterns, incorrect depth perception, or reduced image clarity, which degrade an overall viewing experience of users. Thus, the calibration of the multiscopic displays using captured images of the display area, multiscopic images, and initial estimated values of the at least one parameters ensures that the multiscopic displays produce accurate multiscopic images, providing an intended three-dimensional (3D) effect (namely, a depth perception) or multi-view functionality without any visual distortions. This significantly improves the overall viewing experience of the users.

For illustration purposes, there will now be described how the system and the method work to achieve the aforementioned technical benefits. In operation, the aforementioned steps can be performed as follows:

1. The optical location of each eye of the at least one user relative to the display area is detected using the tracker. Such trackers are well-known in the art. Throughout the present disclosure, the term "optical location" refers to a position of a viewer whereat light emitted by the display area of the multiscopic display is perceived by the viewer. It will be appreciated that the term "viewer" encompasses at least one of: a given eye of a given user, a given camera. The term "given eye" encompasses both a left eye and a right eye of the given user. Optionally, a given optical location is represented in a given coordinate space. As an example, the given coordinate space may be a Cartesian coordinate space.

In some implementations, the display area is visible to the given eye of the given user through a reflective surface (for example, such as a semi-reflective surface of an optical combiner) arranged on an optical path of the multiscopic display. In such implementations, the optical location of each eye of the at least one user is understood to be a relative virtual location of the each eye of the at least one user with respect to the reflective surface. In other implementations, the display area is directly visible to the given eye without any reflective surface in the optical path.

In such implementations, the optical location of each eye of the at least one user is understood to be a relative location of each eye of the at least one user with respect to the display area.

2. The optical location of the at least one camera relative to the display area is determined or retrieved. In this regard, in some implementations, the optical location of the at least one camera is determined by utilising the tracker. In other implementations, the optical location of the at least one camera is retrieved from a data repository communicably coupled to the at least one processor, wherein a plurality of optical locations of the at least one camera relative to the display area are pre-determined (namely, pre-known) and pre-stored at said data repository. The data repository could, for example, be implemented as a memory of the at least one processor, a memory of the tracker, a memory of a computing device, a removable memory, a cloud-based database, or the like. Examples of the computing device include, but are not limited to, a laptop, a tablet, a phablet, and a smartphone.

It will be appreciated that the phrase "optical location of the at least one camera" refers to a position of the at least one camera wherefrom light emitted by the display area of the multiscopic display is captured by the at least one camera in a manner equivalent to how the light would be perceived by a user's eye located at a same position as that of the at least one camera. Thus, it can be understood that the optical position of the at least one camera serves as a reference point for simulating a perspective of the user's eye relative to the display area, during the calibration of the multiscopic display.

3. The initial estimated value of the at least one parameter of a multiscopic optical element of the multiscopic display is selected. In this regard, the initial estimated value can be understood to be a closest possible guess for the at least one parameter, and thus it may be off (namely, deviated in magnitude) from the refined estimated value of the at least one parameter. Throughout the present disclosure, the term "parameter" of the multiscopic optical element refers to a measurable or adjustable characteristic of the multiscopic optical element that defines its optical alignment, structure and/or operational behaviour, which affects quality and accuracy of images produced by the multiscopic display. Optionally, the at least one parameter comprises at least one of: a pitch, an orientation, a thickness, a phase, of the multiscopic optical element.

4. The multiscopic image to be displayed via the multiscopic display, is generated, based on the initial estimated value of the at least one parameter and the optical location of each eye of the at least one user.

In this regard, the initial estimated value defines an estimated optical behaviour of the multiscopic display, i.e., how light corresponding to visual content to be shown to the at least one user is expected to be spatially directed via the multiscopic optical element toward particular optical locations. For example, when the multiscopic optical element is implemented as a lenticular array, an initial estimated value of at least one of: the pitch, the orientation, the thickness, the phase, determines how pixels of the multiscopic display beneath each lenticule of the lenticular array contribute to light rays emitted at different angles corresponding to the particular optical locations. Additionally, the optical location of each eye of the at least one user defines an intended viewing position and viewing direction for each rendered view of the visual content. The step of generating the multiscopic image using the initial estimated value and the optical location can be performed using any suitable well-known technique. Throughout the present disclosure, the term "multiscopic image" is used to refer to a light field image or an autostereoscopic image that, when displayed at the multiscopic display, produces a synthetic light field. Said synthetic light field presents different images to different eyes of the at least one user, meaning that the multiscopic image being displayed is not the same as what any individual eye directly perceives.

5. The multiscopic image is displayed via the multiscopic display, whilst the at least one image of the display area is captured using the at least one camera. In this regard, since the calibration of the multiscopic display is being performed on-the-fly, the multiscopic image is displayed to produce the synthetic light field. Optionally, a given part of the synthetic light field is emitted towards the given eye, thereby presenting a given virtual image (representing given virtual content) to the given eye. Furthermore, positioning the at least one camera in a manner that the display area lies at least partially within the field of view of the at least one camera enables in capturing the at least one image of the display area from a perspective of the optical location of the at least one camera. An exemplary image captured by the at least one camera has been illustrated in conjunction with FIG. 3B, for sake of better understanding and clarity.

It will be appreciated that the field of view of the at least one camera encompasses both a direct field of view and a reflected field of view encompasses both a direct field of view and a reflected field of view (for example, via the semi-reflective surface of the optical combiner). This means that the at least one camera is capable of capturing images of the display area directly and/or through a reflective surface. In some scenarios where the display area is directly visible to the at least one camera without any reflective surface in the optical path, the direct field of view allows the at least one camera to capture the images of the display area directly. In such scenarios, the at least one captured image would represent a direct view of the display area. This, for example, is applicable where the multiscopic display is implemented as a transparent display. In other scenarios where the display area is visible to the at least one camera through the reflective surface, the reflected field of view allows the at least one camera to capture the images of the display area indirectly. In such scenarios, the at least one captured image would represent a reflected view of the display area. In yet other scenarios where the display area is visible to the at least one camera both directly and through the reflective surface, the direct field of view allows to capture the display area as-is, while the reflected field of view allows to capture the display area in a reflected manner. In such scenarios, the at least one image would represent both the direct view and the reflected view of the display area. It is noteworthy that when the field of view of the at least one camera is the direct field of view, the optical location of the at least one camera is understood to be a relative location of the at least one camera with respect to the display area. On the other hand, when the field of view of the at least one camera is the reflected field of view, the optical location of the at least one camera is understood to be a relative virtual location of the at least one camera with respect to the reflective surface.

6. The refined estimated value of the at least one parameter of the multiscopic optical element is determined based on the at least one captured image, the multiscopic image, the initial estimated value of the at least one parameter, and the optical location of the at least one camera. In this regard, the at least one captured image represents what the at least one camera actually observed from its optical location when the multiscopic image was displayed. The initial estimated value of the at least one parameter defines how the multiscopic optical element is currently assumed to direct light emanating from different regions of the display toward different optical locations. When (actual) visual representation in the at least one captured image differs from expected visual representation in the at least one captured image (that should have been observed in the at least one captured image based on the multiscopic image, the initial estimated value of the at least one parameter, and the optical location of the at least one camera), it indicates that the initial estimated value of the at least one parameter is considerably different from (namely, greater than or smaller than) an actual value of the at least one parameter. This results in spatial variations or visual artifacts in the at least one captured image. In this regard, the at least one processor is optionally configured to analyse the spatial variations or visual artifacts in the at least one captured image, by taking into account the initial estimated value of the at least one parameter and the multiscopic image, to iteratively refine (namely, improve) the initial estimated value of the at least one parameter, in order to determine the refined estimated value of the at least one parameter. Advantageously, this enables on-the-fly, automatic refinement of the at least one parameter of the multiscopic optical element, thereby eliminating a need for dedicated calibration patterns or interruptions during a normal operation of the multiscopic display, and ensuring accurate multiscopic rendering in various viewing conditions.

It will be appreciated that in order to ensure that the at least one captured image accurately represents the display area and can be effectively analysed for calibration purposes, the at least one processor can perform some additional processing steps which address potential distortions and misalignments in the at least one captured image.

Optionally, in this regard, the at least one processor is configured to rectify the at least one captured image by undistorting and cropping, to represent the display area only. Performing the step of rectifying the at least one captured image by undistorting and cropping ensures that the at least one captured image is corrected for any distortions or extraneous objects that may affect the accuracy of the calibration process. By undistorting the at least one captured image, the at least one processor corrects geometric distortions (for example, such as a pincushion distortion, a barrel distortion, or other similar distortions) in the at least one captured image. This is necessary to perform because the distortions can cause inaccuracies in visual representation of the display area in the at least one captured image, resulting into errors, for example, in the refined estimated value of the at least one parameter. By undistorting the at least one captured image, the at least one processor ensures that the at least one captured image accurately represents a geometry of the display area. It will be appreciated that undistorting the at least one captured image compensates for distortions in an optical path from the multiscopic display towards the at least one camera, due to at least one of: an optical combiner, a semi-reflective mirror, a curvature of the display area, a curvature of the optical combiner. Furthermore, the at least one processor can perform cropping to isolate the display area in the at least one captured image, removing any extraneous objects other than the display area. This ensures that visual information of only relevant portion of the at least one captured image (i.e., the display area) is available for analysis, improving the efficiency and accuracy of the calibration process. The step of rectifying the at least one image by undistorting and cropping can be performed using any suitable well-known technique.

Additionally, optionally, the system further comprises an optical combiner arranged on an optical path of the multiscopic display, and wherein when rectifying, the at least one processor is configured to rectify the at least one captured image by also mirroring the at least one captured image, based on an optical path from the multiscopic display towards the at least one camera via the optical combiner. In this regard, the at least one captured image is inverted or flipped due to optical properties of a semi-reflective surface of the optical combiner that typically changes an orientation of the at least one captured image, when light emitted from the display area reflect off the optical combiner towards the at least one camera. Due to this, the at least one captured image no longer corresponds to an actual spatial orientation of the display area. This misrepresentation can lead to difficulties and errors in analysing the at captured image. By mirroring the at least one captured image, the at least one processor corrects an inversion of the at least one captured image, ensuring that it is properly oriented and accurately represents the display area. The step of mirroring the at least one image can be performed using any suitable well-known image processing technique.

It will also be appreciated that meaningful refinement of the initial estimated value of the at least one parameter can only occur in regions of the display area where the multiscopic image comprises high-frequency features aligned with a periodic direction of the multiscopic optical element. Those regions of the display areas which have low-frequency features (for example, such as a uniform colour intensity) do not contribute useful information to said refinement, as they generate no perceptible variation when the initial estimated value is deviated from the refined estimated value. Therefore, the at least one processor may optionally identify those regions within the at least one captured image that contribute useful error signals, and restrict its analysis to those regions only. Such an analysis may improve computational efficiency and avoids introducing noise from un-informative regions of the display area, thereby increasing accuracy and stability of the refinement process. Alternatively, optionally, the at least one processor may accumulate such error signals over time during an operation of the multiscopic display, thereby building a composite understanding of how the at least one parameter should be refined. This accumulation may enable calibration across a broader region of the display area, thereby enhancing robustness of the refinement process.

Optionally, the at least one processor is configured to:

calculate at least one expected image of the display area that is expected to be captured by the at least one camera during display of the multiscopic image, based on the multiscopic image, the initial estimated value of the at least one parameter, the optical location of each eye of the at least one user, and the optical location of the at least one camera; and determine at least one interference pattern based on a difference between the at least one captured image and the at least one expected image of the display area, wherein the refined estimated value of the at least one parameter of the multiscopic optical element is determined based further on the at least one interference pattern.

Optionally, in this regard, when determining the refined estimated value of the at least one parameter, the at least one processor is configured to analyse the at least one interference pattern to identify different characteristics of the at least one interference pattern. Such different characteristics could, for example, be a frequency of an interference beat in the at least one interference pattern, an orientation of the interference beat, a spatial distribution of interference beats in the at least one interference pattern, and the like. These different characteristics can provide information pertaining to how much the initial estimated value is to be adjusted iteratively to reach closer to the refined estimated value. Based on the aforesaid analysis, the at least one processor can refine the initial estimated value by generating subsequent multiscopic images, capturing corresponding images of the display area, calculating corresponding expected images of the display area, and determining corresponding interference patterns, for subsequent iterations. With each iteration, the at least one processor adjusts the initial estimated value to progressively converge towards the refined estimated value. This iterative approach ensures that the calibration process is precise and robust, even in cases where the initial estimated value is significantly off from the refined estimated value. By refining the initial estimated value automatically in this manner, the system and the method facilitate in determining accurate calibration parameters for the multiscopic optical element, thereby eliminating visual artifacts and enabling accurate image rendering.

It will be appreciated that when the initial estimated value of the at least one parameter is off from the refined estimated value of the at least one parameter, the at least one interference pattern would be generated (based on the aforesaid difference, as described hereinabove). It will be appreciated that the initial estimated value does not necessarily have to be knowingly off from the refined estimated value during the calibration process. When the initial estimated value happens to be correct from the beginning (i.e., when the closest possible guess is correct in a first go only), no interference pattern would be generated (based on the aforesaid difference). In such a case, the calibration process is not required to be performed. However, even in this scenario, it is important for the system to verify that the initial estimated value is indeed correct. This verification ensures that an absence of the at least one interference pattern is not due to other factors (for example, errors in image capturing or image processing), but is genuinely because the initial estimated value is already correct. It is noteworthy that in a real-world scenario, an actual value of the at least one parameter (for example, such as a pitch of the multiscopic optical element) is typically not known with high precision, for example, due to measurement inaccuracies arising from its extremely small magnitude, thermal variations, or human error. Therefore, the initial estimated value is selected as the closest possible guess or approximation, and then iteratively refined towards the refined estimated value, based on an analysis of the at least one interference pattern.

Optionally, when calculating the at least one expected image of the display area, the at least one processor is configured to determine a colour of light rays emitted by a given region of the display area toward the at least one camera. This can be performed for each region of the display area that lies within the field of view of the at least one camera. The at least one expected image of the display area can be served as a reference for comparing it with the at least one captured image. It will be appreciated that the at least one captured image and the at least one expected image of the display area would be different when the initial estimated value of the at least one parameter used to generate the multiscopic image is considerably different from the actual value of the at least one parameter. Due to this, the at least one interference pattern is determined, for example, by calculating a difference between a pixel value of a given pixel in the at least one captured image and a pixel value of a corresponding pixel in the at least one expected image. The step of calculating the at least one expected image and the step of determining the at least one interference pattern can be performed using any suitable well-known techniques.

The term "interference pattern" refers to a pattern having alternating bands of different colours and/or intensities. The term "interference beat" refers to an individual band within a given interference pattern, having at least one colour and/or intensity that is different from at least one colour and/or intensity of an adjacent band within the given interference pattern. It will be appreciated that that a single interference beat could have more than one colour and/or intensity.

Optionally, in some implementations, the at least one processor is configured to:

for each of a plurality of multiscopic images that present virtual content across different regions of the display area, determine the optical location of each eye of the at least one user;

generate each of the plurality of multiscopic images based on the optical location of each eye of the at least one user and the initial estimated value of the at least one parameter;

display each of the plurality of multiscopic images via the multiscopic display, whilst capturing at least one corresponding image of the display area using the at least one camera;

calculate at least one corresponding expected image of the display area; and determine at least one corresponding interference pattern based on a difference between the at least one corresponding captured image and the at least one corresponding expected image of the display area; and accumulate a multi-image interference pattern based on respective interference patterns corresponding to the plurality of multiscopic images, wherein the refined estimated value of the at least one parameter of the multiscopic optical element is determined based further on the multi-image interference pattern.

This implementation provides a significant enhancement in the accuracy and robustness of the on-the-fly, automated calibration by performing the step of accumulating the multi-image interference pattern and utilising it for determining the refined estimated value of the at least one parameter. This is because in a practical scenario (particularly, in augmented reality (AR) use cases), only a subset of the display area is typically active at any given time instant for rendering the virtual content towards the at least one user, while a remainder of the display area may remain transparent, black, or unused. As a result, displaying a single multiscopic image may only subsequently results in producing interference pattern information for a limited portion of the display area, restricting the calibration process to localised region(s) and resulting into suboptimal parameter estimation. By accumulating the respective interference patterns corresponding to the plurality of multiscopic images, the system is able to aggregate calibration data for a broader portion of the display area. This enables the at least one processor to generate the multi-image interference pattern that represents comprehensive information encompassing regions of the display areas that were previously inactive or visually uniform, in order to iteratively adjust the initial estimated value in a highly accurate and reliable manner. The refined estimated value of the at least one parameter of the multiscopic optical element is thereby determined based on comprehensive understanding of how the multiscopic display behaves across its entire display area, rather than from isolated regions of the display area.

A technical benefit of this implementation is that it ensures that even in dynamic content environments where active regions of the display area shift as virtual content changes, the system continuously improves its calibration accuracy. This reduces a risk of localised calibration errors, enables the system to operate reliably without requiring special calibration sequences or full-screen test patterns, and supports on-the-fly, continuous calibration across an entire usable display area, with minimal visual intrusion, thus enhancing robustness and user experience of multiscopic rendering systems in real-world use.

The term "virtual content" refers to a computer-generated content (namely, a digital content or a virtual object) that is to be presented to the given eye. Examples of the virtual content may include, but are not limited to, a virtual navigation tool, a virtual gadget, a virtual message, a virtual entity, a virtual entertainment media, a virtual vehicle or part thereof, and a virtual information. In an example, the virtual content may be a two-dimensional (2D) user interface (UI) element. Such a 2D UI element could pertain to, for example, a virtual navigation tool, a virtual gadget, a virtual message, a virtual entity, a virtual entertainment media, a virtual information, or similar. The virtual content could alternatively be a 3D virtual content.

Optionally, the system further comprises an optical combiner arranged on an optical path of the multiscopic display, wherein the at least one camera is positioned such that a region of the display area lies within the field of view of the at least one camera both directly and via reflection from the optical combiner, wherein when calculating the at least one expected image of the display area, the at least one processor is configured to calculate a first expected image and a second expected image of the display area corresponding respectively to a direct view and a reflected view of the display area, wherein the at least one expected image comprises the first expected image and the second expected image, and wherein when determining the at least one interference pattern, the at least one processor is configured to:

extract a first image segment of the at least one captured image representing a direct view of the region of the display area;

extract a second image segment of the at least one captured image representing a reflected view of the region of the display area;

determine a first interference pattern based on a difference between the first image segment of the at least one captured image and a corresponding image segment of the first expected image of the display area; and determine a second interference pattern based on a difference between the second image segment of the at least one captured image and a corresponding image segment of the second expected image of the display area;

wherein the at least one interference pattern comprises the first interference pattern and the second interference pattern.

In this regard, by extracting the first image segment that corresponds to the direct view of the region, the at least one processor analyses only a portion of the at least one captured image that corresponds to a line-of-sight optical path between the at least one camera and the display area, free of any reflection-induced distortions. Similarly, the second image segment that corresponds to the reflected view of the same region, would represent same visual content, but from a different viewing angle, due to a reflection path. While reflections may introduce minor optical distortions or brightness variations, a geometric difference in viewing angles still provides an additional data point for analysis of the second interference pattern, enabling cross-verification of calibration parameters. The steps of extracting the first image segment and the second image segment can be performed using any suitable well-known technique. The steps of calculating the first expected image and the second expected image are performed in a similar manner, as discussed earlier in detail with respect of calculation of the at least one expected image. Similarly, the steps of determining the first interference pattern and the second interference pattern are performed in a similar manner, as discussed earlier in detail with respect of determining of the at least one interference pattern.

A technical benefit of utilising the first interference pattern and the second interference pattern for determining the refined estimated value of the at least one parameter lies in the system's ability to perform multi-view calibration from a single captured image. This is because since the same display area is observed from two different viewing angles, the at least one processor would have access to redundant and complementary calibration data for the same region of the display area. Thus, when determining the refined estimated value of the at least one parameter, the at least one processor can cross-validate the refined estimated value obtained upon analyses of the first interference pattern and the second interference pattern. This beneficially enhances robustness of the calibration process by compensating for localised artifacts such as noise, occlusion, or spatial non-uniformities that may affect one viewing angle but not the other viewing angle, thereby enabling high-quality and distortion-free multiscopic image rendering. Moreover, the reflected view of the region of the display area may enable an angular diversity, which is particularly valuable for detecting subtle misalignments in the multiscopic optical element that may not manifest strongly from a single viewing angle. For example, discrepancies in a pitch, a phase, or an orientation of the multiscopic optical element may produce distinct interference patterns under different projection geometries, and combining these interference patterns enables an accurate estimation of the refined value of the at least one parameter.

There will now be discussed how refined estimated values of different parameters of the multiscopic optical element are determined, by analysing the at least one interference pattern.

Optionally, the at least one parameter comprises a pitch of the multiscopic optical element, wherein when determining the refined estimated value of the at least one parameter, the at least one processor is configured to:

determine a frequency of an interference beat in the at least one interference pattern; and determine a refined estimated value of the pitch based on an initial estimated value of the pitch and the frequency of the interference beat.

The term "pitch" of the multiscopic optical element can be defined depending on how the multiscopic optical element is implemented. The pitch of the multiscopic optical element determines how a multiscopic image is split and directed towards different viewing angles. In a case, when the multiscopic optical element is implemented as a lenticular array, the pitch is a centre-to-centre distance between adjacent lenticules (for example, individual cylindrical lenses). In another case, when the multiscopic optical element is implemented as a parallax barrier, the pitch is a centre-to-centre distance between adjacent transparent slits in the parallax barrier.

Further, the at least one processor can analyse the at least one interference pattern to determine the frequency of the interference beat. Typically, the frequency of the interference beat is inversely related to a wavelength of the interference beat. Optionally, in this regard, the at least one processor is configured to determine a spatial distance between centres of two adjacent interference beats of a same colour in the at least one interference pattern, for determining the wavelength of the interference beat. Optionally, in some implementations, when determining the frequency of the interference beat in the at least one interference pattern, the at least one processor is configured to employ a Fourier Transform-based technique.

It will be appreciated that when an estimated value of the thickness of the multiscopic optical element is correct, the interference beats in the at least one interference pattern are equidistant from each other. Otherwise, when the estimated value of the thickness of the multiscopic optical element is considerably different from an actual value of the thickness, a density of interference beats in a central region of the at least one interference pattern is greater than a density of interference beats in a peripheral region of the at least one interference pattern. For determining the refined estimated value of the pitch, it can be assumed that the estimated value of the thickness of the multiscopic optical element is already correct and pre-known. It is to be understood that the initial estimated value of the pitch is a closest possible guess for the refined estimated value of the pitch and thus it is off from the refined estimated value of the pitch. Optionally, in this regard, the at least one processor is configured to select the initial estimated value of the pitch, wherein the multiscopic image is generated based further on the initial estimated value of the pitch.

A relationship between the refined estimated value of the pitch, the initial estimated value of the pitch, and the frequency of the interference beat can be expressed mathematically as:

$$1/W = \text{absolute of } (1/C - 1/E),$$

wherein

"W" refers to the wavelength of the interference beat;

"1/W" refers to the frequency of the interference beat;

"C" refers to the refined estimated value of the pitch of the multiscopic optical element; and "E" refers to the initial estimated value of the pitch of the multiscopic optical element.

By solving the above equation, the at least one processor can determine the refined estimated value of the pitch. A technical benefit of this implementation is that it allows the at least one processor to refine a value of the pitch with high accuracy by leveraging the frequency of the interference beat, even when initial estimated values of the pitch are significantly off from the refined estimated value of the pitch.

For illustration purposes only, there will now be considered an example wherein a lenticular array comprises lenticular lenses that are designed to have a width of 0.62 millimetres (mm) with an expected manufacturing and thermal variation of +0.02 mm. This means the refined estimated value of the pitch of the lenticular lenses is expected to lie within a range of 0.60 mm to 0.64 mm under normal operating conditions.

In this example, the initial estimated value of the pitch of the multiscopic optical element (namely, a lenticular lens) is initially selected as 0.7 mm and the wavelength of the interference beat in a given interference pattern produced is assumed to be equal to 5 mm. Using the aforesaid mathematical expression, the refined estimated value of the pitch of the multiscopic optical element can be calculated as:

$$1/5 = \text{absolute of } (1/C - 1/0.7)$$

C=0.614 mm or 0.814 mm

However, since the designed width of the lenticular lenses is known to be approximately 0.62 mm+0.02 mm, the first calculated value of 0.614 mm falls within the expected range for the refined estimated value of the pitch, while the second calculated value of 0.814 mm lies outside this expected range. Therefore, the second calculated value of 0.814 mm can be ruled out as a wrong alternative, and the first calculated value of 0.614 mm is thereby identified as the refined estimated value of the pitch of the multiscopic optical element.

As noted hereinabove, while the determination of the refined estimated value of the pitch based on the frequency of the interference beat provides an accurate value, it often results in two possible refined estimated values of the pitch due to the absolute nature of the aforesaid mathematical expression. To resolve this ambiguity and reliably identify the refined estimated value of the pitch out of its two alternative values, the at least one processor can employ some additional steps. Optionally, in this regard, when determining the refined estimated value of the pitch, the at least one processor is configured to rule out a wrong one out of two alternative refined estimated values of the pitch, based on at least one of:

a pre-known approximate refined estimated value of the pitch;

at least one repetition of the step of selecting the initial estimated value of the pitch, the step of generating the multiscopic image, the step of displaying the multiscopic image, the step of capturing the at least one image of the display area, the step of calculating the at least one expected image, the step of determining the at least one interference pattern, and the step of determining the refined estimated value of the pitch, using at least one different initial estimated value of the pitch.

Optionally, the at least one parameter comprises a phase of the multiscopic optical element, wherein when determining the refined estimated value of the at least one parameter, the at least one processor is configured to:

select an interference beat in the at least one interference pattern that corresponds to a point in the at least one captured image closest to an origin of the at least one captured image;

retrieve a colour value of a group of neighbouring pixels, from the at least one expected image, at a location corresponding to the selected interference beat;

determine a distance between an origin of the at least one interference pattern corresponding to the origin of the at least one captured image and a centre of a first part of the selected interference beat having the retrieved colour value;

determine a refined estimated value of the phase based on an initial estimated value of the phase and the determined distance.

The term "phase" of the multiscopic optical element refers to a lateral alignment (namely, a lateral shift or offset) between the multiscopic optical element and a pixel array of the multiscopic display. Typically, the phase of the multiscopic optical element is measured as a fraction of the pitch of the multiscopic optical element relative to the pixel array. It will be appreciated that the initial estimated value of the phase is a closest possible guess for the refined estimated value of the phase. Optionally, the at least one processor is configured to select the initial estimated value of the phase, wherein the multiscopic image is generated based further on the initial estimated value of the phase. The phase indicates relative positions of crests and valleys of the at least one interference pattern. Determination of the refined estimated value of the phase involves adjusting values of the initial estimated value of the phase in a manner that a crest of the at least one interference pattern is aligned with (namely, correspond to) the origin of the at least one captured image. In an example, for a lenticular array in which a lenticular lens is designed to have a width of 0.62 mm, a pitch of the multiscopic optical element (namely, the lenticular lens) can be selected as 0.62 mm. In such a case, the initial estimated value of the phase may be selected as 0.1 times the pitch (i.e., equal to 0.062 mm), representing a small lateral offset.

Typically, the origin of the at least one captured image lies at a centre of the display area. It will be appreciated that upon rectification, when the at least one captured image represents the display area only (and no extraneous objects), an optical centre of the at least one captured image coincides with the centre of the display area. A technical benefit of defining the origin of the at least one captured image at the centre of the display area is that it simplifies the calibration process.

When the initial estimated value of the pitch is adjusted (irrespective of the phase), the at least one interference pattern "zooms in" or "zooms out", but the origin of the at least one captured image remains stationary. Moreover, when the origin of the at least one interference pattern corresponds to the origin of the at least one captured image, it is ensured that a coordinate system of the at least one interference pattern matches with a coordinate system of the at least one captured image (after rectification and cropping). This makes it easier to determine the distance between the origin of the at least one interference pattern and the centre of the first part of the selected interference beat. When the origin of the at least one captured image lies at the centre of the display area, the at least one processor identifies the selected interference beat as the one that is closest to the centre of the display area, for example, such as a central, black-coloured interference beat amongst all black-coloured and white-coloured interference beats in the at least one interference pattern. In some cases, the origin of the at least one captured image may be defined elsewhere, away from the centre of the display area. Optionally, when selecting the interference beat, the at least one processor is configured to analyse a central portion of the at least one interference pattern. It will be appreciated that, in some implementations, the step of selecting the interference beat is preferably performed for the multi-image interference pattern (that is accumulated based on respective interference patterns corresponding to the plurality of multiscopic images), in order to ensure that there actually is an interference beat that corresponds to the point in the at least one captured image that is closest to the origin of the at least one captured image.

The distance between the origin of the at least one interference pattern and the centre of the first part of the selected interference beat represents a lateral misalignment between the multiscopic optical element and the pixel array. Said distance is critical for calculating the phase shift. By determining how far the selected interference beat is from said origin, the at least one processor can quantify the lateral misalignment. It will be appreciated that for a lenticular array, the phase defines a relative position of the lenticular array with respect to the centre of the display area, expressed in a normalised range of 0 to 1. A phase value of 0.5 corresponds to a center of a lenticular lens of the lenticular array, while a phase value of 0 or 1 corresponds to a boundary between two adjacent lenticular lenses of the lenticular array. When the at least one interference pattern is determined, adjusting (namely, increasing or decreasing) the initial estimated value of the phase would laterally shift the at least one interference pattern with respect to the origin of the at least one captured image. Thus, a full phase cycle (from 0 to 1) corresponds to moving the at least one interference pattern by exactly one interference beat, meaning that the at least one interference pattern appears identical after completing the full phase cycle. Therefore, adjustment to the initial estimated value of the phase can be performed in terms of sizes relative to interference beats in a currently-determined interference pattern. Optionally, when determining the distance between said origin and said centre, the at least one processor is configured to employ at least one of: a Fourier Transform-based technique, a gradient-based shift detection technique. The aforesaid techniques are well-known in the art.

The at least one processor can determine the refined estimated value of the phase to align the selected interference beat with the origin of the at least one captured image. This may involve adjusting a lateral position of the multiscopic optical element or digitally re-mapping rendered views to compensate for the lateral misalignment. A technical benefit of determining the refined estimated value of the phase in this manner ensures that the multiscopic optical element is well-aligned with the pixel array, eliminating phase-related visual artifacts in images, thereby improving an overall viewing experience of the at least one user.

Optionally, the at least one parameter comprises an orientation of the multiscopic optical element, wherein when determining the refined estimated value of the at least one parameter, the at least one processor is configured to:

determine a beat orientation in the at least one interference pattern; and determine a refined estimated value of the orientation based on an initial estimated value of the orientation and the determined beat orientation.

The term "orientation" of the multiscopic optical element refers to a rotational alignment of the multiscopic optical element with respect to the pixel array. In other words, the orientation is a rotation of a longitudinal axis (i.e., a Y-axis) of the multiscopic optical element with respect to a longitudinal axis (i.e., a Y-axis) of the pixel array, specifically, about a Z-axis (namely, a depth axis) of the multiscopic display. It will be appreciated that in a typical implementation, the longitudinal axis of the multiscopic optical element is slightly aligned (for example, such as by 6 degrees) with respect to the longitudinal axis of the pixel array, for minimising visual artifacts (for example, such as aliasing effects or colour fringing).

It will be appreciated that the initial estimated value of the orientation is a closest possible guess for the refined esti- mated value of the orientation. Optionally, the at least one processor is configured to select the initial estimated value of the orientation, wherein the multiscopic image is gener- ated based further on the initial estimated value of the orientation. It will also be appreciated that whenever the initial estimated value of the pitch is considerably different from an actual value of the pitch, the at least one interference pattern is generated, irrespective of the initial estimated value of the orientation. When the initial estimated value of the phase is considerably different from an actual value of the phase, the at least one interference pattern is generated with interference beats aligned at specific orientations. It is noteworthy that the refined estimated value of the pitch and the refined estimated value of the phase can be determined by analysing a single interference pattern, but determination of the refined estimated value of the orientation requires analysing at least two interference patterns corresponding to at least two captured images of the display area with at least two different calibration settings.

The term "beat orientation" refers to an angle at which a given interference beat in the at least one interference pattern is aligned with respect to a longitudinal axis (i.e., a Y-axis) of the display area. It will be appreciated that when the initial estimated value of the orientation is considerably different from an actual estimated value of the orientation, a given interference beat in the at least one interference pattern would be oriented at an angle that is different from an actual angle at which the multiscopic optical element is oriented with respect to the pixel array (namely, the orien- tation of the multiscopic optical element with respect to the pixel array). The step of determining the beat orientation in the at least one interference pattern can be performed using any suitable well-known technique.

Once the initial estimated value of the orientation and the beat orientation are known, the at least one processor iteratively adjusts the initial estimated value and generates subsequent multiscopic images, in order to reach the refined estimated value, i.e., until the refined estimated value of the orientation is determined. For each adjustment in the initial estimated value of the orientation, a corresponding interfer- ence pattern is generated and the beat orientation is deter- mined. A technical benefit of this implementation is that it provides a precise and accurate way for determining the refined estimated value of the orientation. This ensures that the refined estimated value is as similar to the actual value of the orientation as possible. Due to this, orientation-related visual artifacts, such as generation of skewed or distorted images, are eliminated, and it is ensured that the multiscopic display is susceptible to produce high-quality, accurate mul- tiscopic images.

It is noteworthy that determining a correct direction for iteratively adjusting initial estimated values of the orienta- tion to reach the refined estimated value is significantly important. In this regard, an initial estimated value of the orientation is to be rotated either in a clockwise direction or in a counter-clockwise direction, to progressively reach toward the refined estimated value of the orientation. How- ever, there are two possible directions for iteratively adjust- ing the initial estimated value of the orientation, and choos- ing a wrong direction for rotating the initial estimated value of the orientation can diverge the calibration process away from the refined estimated value of the orientation. To ensure that iterations for the initial estimated value of the orientation converge toward the refined estimated value of the orientation, it is critical to rule out the wrong direction early in the calibration process. By ruling out the wrong direction, the system ensures that the iterative process is efficient, accurate, and converges toward the refined esti- mated value of the orientation.

Optionally, in this regard, when determining the refined estimated value of the orientation, the at least one processor is configured to rule out a wrong one out of two alternative directions in which the initial estimated value of the orien- tation is to be rotated to reach the refined estimated value of the orientation, by:

repeating the step of selecting the initial estimated value of the orientation, the step of generating the multi- scopic image, the step of displaying the multiscopic image, the step of capturing the at least one image of the display area, the step of calculating the at least one expected image, the step of determining the at least one interference pattern, and the step of determining the beat orientation, using different initial estimated values of the orientation;

detecting a change in the beat orientation; and adjusting the different initial estimated values of the orientation in a direction that is opposite to a direction of the detected change in the beat orientation.

By iteratively selecting the different initial estimated values of the orientation and detecting changes in the beat orientation during these iterations, the at least one processor identifies whether or not the initial estimated value of the orientation is being adjusted in a correct direction (i.e., a clockwise direction or a counter-clockwise direction), thereby ruling out a wrong direction in the calibration process. This is done by analysing how the beat orientation in the at least one interference pattern changes during the iterations, indicating whether the rotations of the initial estimated value of the orientation are moving closer to or further from the refined estimated value of the orientation.

When the refined estimated value of the orientation (that is almost similar to the actual value of the orientation) is reached, a corresponding beat orientation would match as close to the refined estimated value of the orientation as possible, i.e., said corresponding beat orientation and the refined estimated value of the orientation would be (nearly) same. However, in every other iteration where the initial estimated value of the orientation is either greater than or less than the refined estimated value of the orientation, a corresponding beat orientation would not be equal to the initial estimated value of the orientation, and would be different from the refined estimated value of the orientation. This means that when the refined estimated value of the orientation is reached, the corresponding beat orientation would be almost equal to the refined estimated value of the orientation, indicating that the refined estimated value of the orientation is an actual angle at which the multiscopic optical element is oriented with respect to the pixel array (namely, the orientation of the multiscopic optical element with respect to the pixel array). For all other initial estimated values of the orientation, irrespective of whether they are less than or greater than the refined estimated value, the corresponding beat orientation would be different from this refined estimated value of the orientation. This behaviour provides a reliable indication to identify the refined esti- mated value of the orientation by iteratively analysing changes in the beat orientation for different initial estimated values of the orientation, and allows the at least one pro- cessor to determine whether the iterations are converging toward the refined estimated value of the orientation or diverging away from the refined estimated value of the orientation.

A technical benefit of this implementation is that it enhances the precision of the calibration process by using the aforesaid directional correction logic to rule out the wrong one out of the two alternative directions. Iterating with the different initial estimated values of the orientation ensures high accuracy, as the at least one processor can refine the initial estimated value of the orientation of the multiscopic optical element in a step-wise manner, even when the initial estimated value of the orientation is significantly off from the refined estimated value of the orientation. This approach minimises orientation-related visual artifacts, such as generation of skewed or distorted images, and it can be ensured that the multiscopic display is susceptible to produce high-quality, accurate multiscopic images.

For illustration purposes only, there will now be considered an example where the initial estimated value of the orientation is selected as 0 degree. In such a case, a corresponding value of the beat orientation is determined to be 10 degrees. When the different initial estimated values of the orientation are used in a sequence: 2 degrees, 4 degrees, 6 degrees, 8 degrees, 10 degrees in a clockwise direction (from the initial estimated value of 0 degree), corresponding values of the beat orientation determined for these different initial estimated values changed in a sequence: 2.5 degrees, 3.6 degrees, 6 degrees, 7.4 degrees, 8.3 degrees, respectively. From this sequence, it can be inferred that those initial estimated values of the orientation that are different from 6 degrees result in the beat orientation that is different from respective ones of those initial estimated values; however, the initial estimated value of 6 degrees results in the value of the beat orientation that is most similar to its respective initial estimated value of 6 degrees. This value of the beat orientation corresponds most closely to the actual angle at which the multiscopic optical element is oriented with respect to the pixel array (namely, the orientation of the multiscopic optical element with respect to the pixel array). A similar example has been also illustrated in conjunction with FIG. 4, for sake of better understanding and clarity.

Furthermore, optionally, the at least one parameter further comprises a pitch of the multiscopic optical element, wherein when determining the refined estimated value of the at least one parameter, the at least one processor is configured to:

detect when an accuracy of an initial estimated value of the pitch with respect to a refined estimated value of the pitch is less than an accuracy of the initial estimated value of the orientation with respect to the refined estimated value of the orientation; and when the accuracy of the initial estimated value of the pitch is less than the accuracy of the initial estimated value of the orientation, repeat the step of selecting the initial estimated value of the pitch, the step of selecting the initial estimated value of the orientation, the step of generating the multiscopic image, the step of displaying the multiscopic image, the step of capturing the at least one image of the display area, the step of calculating the at least one expected image, the step of determining the at least one interference pattern, and the step of determining the beat orientation, using different initial estimated values of the pitch and a same initial estimated value of the orientation;

detect another change in the beat orientation; and adjust the different initial estimated values of the pitch in a direction that is opposite to a direction of the another change in the beat orientation.

Refinement in the initial estimated value of the pitch (to reach the refined estimated value of the pitch) is performed in the aforesaid iterative manner only when the accuracy of the initial estimated value of the pitch is less than the accuracy of the initial estimated value of the orientation. This is because the pitch and the orientation of the multiscopic optical element are interdependent. The at least one interference pattern is influenced by both the pitch and the orientation of the multiscopic optical element. If the initial estimated value of the orientation were accurate with respect to the refined estimated value of the orientation, a presence of the at least one interference pattern is indicative of inaccuracies in the initial estimated value of the pitch with respect to the refined estimated value of the pitch. Therefore, focusing on refining the initial estimated value of the pitch whilst keeping the initial estimated value of the orientation unchanged ensures that the calibration process targets a primary source of error by resolving pitch-related misalignments without introducing additional variables, making it convenient to identify the refined estimated value of the pitch. This approach ensures that the calibration process is efficient and avoids redundant adjustments. It will be appreciated that the accuracy of the refined estimated value of the pitch can be inferred, for example, by analysing a degree of closeness between the refined estimated value of the pitch and the pre-known approximate refined estimated value of the pitch. Similarly, the accuracy of the initial estimated value of the orientation can be inferred, for example, by analysing how much a corresponding beat orientation approaches toward an actual angle at which the multiscopic optical element is oriented with respect to the pixel array (namely, the orientation of the multiscopic optical element with respect to the pixel array).

A purpose of using the different initial estimated values of the pitch is to iteratively adjust and analyse the at least one interference pattern to subsequently converge toward the refined estimated value of the pitch. In other words, using the different initial estimated values of the pitch allows the at least one processor to ascertain how the at least one interference pattern changes, depending on whether the initial estimated value of the pitch is less than or greater than the refined estimated value of the pitch. When the initial estimated value of the pitch is less than the refined estimated value of the pitch, the beat orientation rotates in one of the clockwise direction and the counter-clockwise direction. On the other hand, when the initial estimated value of the pitch is greater than the refined estimated value of the pitch, the beat orientation rotates in another of the clockwise direction and the counter-clockwise direction. By analysing such changes in rotations of the beat orientation, the at least one processor can iteratively adjust the initial estimated value of the pitch to converge toward the refined estimated value of the pitch, such that with each iteration, rotations of the beat orientation approaches toward the actual angle at which the multiscopic optical element is oriented with respect to the pixel array. Such a directional behaviour of the beat orientation provides a critical feedback to the at least one processor for refining the initial estimated value of the pitch with high accuracy, resulting in high-quality image rendering, upon calibration.

For illustration purposes only, there will now be considered an example where for a lenticular lens of a lenticular array, an initial estimated value of the orientation is selected as 6 degrees, and an initial estimated value of the pitch is selected as 0.74 mm. In such a case, the beat orientation may be determined as 6.5 degrees. When the different initial estimated values of the pitch are used in a sequence: 0.75 mm, 0.76 mm, 0.77 mm, 0.78 mm (while keeping the initial estimated value of the orientation unchanged at 6 degrees), the beat orientation is changed in a sequence: 6.9 degrees, 7.5 degrees, 8 degrees, 8.5 degrees, respectively. From this sequence, it can be inferred that the different initial estimated values of the pitch are not converging toward the refined estimated value of the pitch (for example, equal to 0.69 mm), and a direction of adjusting the different initial estimated values of the pitch is incorrect, and thus the different initial estimated values of the pitch are now to be adjusted in an opposite direction. In this regard, when the different initial estimated values of the pitch are used in a sequence: 0.73 mm, 0.72 mm, 0.71 mm, 0.70 mm (while keeping the initial estimated value of the orientation unchanged at 6 degrees), the beat orientation is changed in a sequence: 6.4 degrees, 6.3 degrees, 6.2 degrees, 6.1 degrees, respectively. From this sequence, it can be inferred that the different initial estimated values of the pitch are now converging toward the refined estimated value of the pitch (i.e., 0.69 mm), and the direction of adjusting these different initial estimated values of the pitch is correct, as they result in making values of the beat orientation converge toward the initial estimated value of the orientation.

Optionally, the at least one parameter comprises a thickness of the multiscopic optical element, wherein when determining the refined estimated value of the at least one parameter, the at least one processor is configured to:

determine a first frequency of interference beats in the at least one interference pattern that correspond to a region toward an edge of the display area, and a second frequency of interference beats in the at least one interference pattern that correspond to a region toward a centre of the display area;

determine a difference between the first frequency and the second frequency; and determine a refined estimated value of the thickness based on an initial estimated value of the thickness and the determined difference.

The term "thickness" of the multiscopic optical element refers to a physical thickness of the multiscopic optical element. It will be appreciated that the initial estimated value of the thickness is a closest possible guess for the refined estimated value of the thickness, and the at least one interference pattern is generated whenever the initial estimated value of the pitch is considerably different from the actual value of the pitch, irrespective of the initial estimated value of the thickness. Optionally, the at least one processor is configured to select the initial estimated value of the thickness, wherein the multiscopic image is generated based further on the initial estimated value of the thickness. It is to be noted that when the initial estimated value of the thickness is considerably different from the actual value of the thickness, the at least one interference pattern is generated with interference beats being spatially variably distributed in the at least one interference pattern. It will also be appreciated that when the multiscopic image is generated based further on the initial estimated value of the thickness, the at least one processor also takes into account an optical thickness of the multiscopic optical element which depends on a refractive index of a material of the multiscopic optical element. This is because the optical thickness can alter how light bends and affects an autostereoscopic effect for which the multiscopic optical element is employed.

When the initial estimated value of the thickness is considerably different from the actual value of the thickness, there would be a spatial variation in the at least one interference pattern, namely, the difference between the first frequency and the second frequency. In other words, when the initial estimated value of the thickness is considerably different from the actual value of the thickness, an optical path length for light rays passing through the multiscopic optical element varies non-uniformly across the display area. At the centre of the display area, the light rays pass through the multiscopic optical element at a more perpendicular angle, resulting in a shorter and more consistent optical path length. This results in a higher density of the interference beats that correspond to the region toward the centre of the display area, and thus a second wavelength (i.e., reciprocal of the second frequency) of these interference beats is shorter. On the other hand, towards the edge of the display area, the light rays pass through the multiscopic optical element at more oblique angles, causing greater variation in the optical path length. This results in a lower density of the interference beats that correspond to the region toward the edge of the display area. Additionally, the thickness of the multiscopic optical element directly affects how the light is refracted or blocked as it passes through. When the initial estimated value of the thickness is considerably different from the actual value of the thickness, effective optical properties (for example, such as a focal length, a refractive index, and the like) of the multiscopic optical element deviate from their intended values. This deviation causes the interference beats to "spread out" or "compress" unevenly corresponding an entirety of the display area, leading to a difference in frequencies of interference beats that correspond to the region toward the edge and to the region toward the centre. This has been also illustrated in conjunction with FIG. 5, for sake of better understanding and clarity.

The at least one processor determines the refined estimated value of the thickness by iteratively adjusting the initial estimated value of the thickness and analysing resulting interference patterns after each adjustment in the initial estimated value of the thickness. The refined estimated value of the thickness is reached or converged when the difference between the first frequency and the second frequency tends to zero (or near-zero) or when a frequency of the interference beats becomes uniform corresponding the entirety of the display area. This uniformity indicates that the interference beats are equidistant in the at least one interference pattern, signifying that the multiscopic optical element is now correctly calibrated in terms of its thickness. A technical benefit of this implementation is that it eliminates thickness-related distortions/artifacts, enhances visual quality of images displayed via the multiscopic display, and ensures reliable calibration for optimal performance of the multiscopic display.

For illustration purposes only, there will now be considered an example where an initial estimated value of the thickness of the multiscopic optical element is selected as 1.8 mm. In such a case, the at least one processor determines that the first frequency of the interference beats is 5 beats per unit distance, while the second frequency of the interference beats is 8 beats per unit distance. This indicates that the initial estimated value of the thickness is considerably different from the actual value of the thickness, as the difference between the first frequency and the second frequency is non-uniform. The at least one processor then iteratively adjusts the initial estimated value of the thickness as follows:

Iteration 1: The initial estimated value of the thickness is selected as 1.9 mm. The first frequency becomes 6 beats per unit distance, the second frequency becomes 7 beats per unit distance, and the difference therebetween is reduced, but still it is non-uniform. Thus, a subsequent iteration is performed.

Iteration 2: The initial estimated value of the thickness is now selected as 2 mm. The first frequency and the second frequency both become 4 beats per unit distance, indicating that the interference beats are now equi-distant in the at least one interference pattern. At this point, the at least one processor determines that the refined estimated value of the thickness is 2 mm, as the difference between the first frequency and the second frequency has converged to zero or near-zero.

It is noteworthy that the step of determining the refined estimated value of the pitch will be performed as a final step in the calibration process. This is because determination of the refined estimated value of the orientation, the refined estimated value of the thickness, and the refined estimated value of the phase are dependent on a presence of the at least one interference pattern. The at least one interference pattern is obtained only when the initial estimated value of the pitch is considerably different from the actual value of the pitch. If the initial estimated value of the pitch is already correct, no interference pattern will be generated.

Therefore, to ensure the presence of the at least one interference pattern required for determining the refined estimated value of the orientation, the refined estimated value of the thickness, and the refined estimated value of the phase, the initial estimated value of the pitch is deliberately chosen to be considerably different from the actual value of the pitch during these steps. Once these refinements of these parameters are completed, the step of determining the refined estimated value of the pitch is performed.

Optionally, in some implementations, the at least one processor is configured to:

generate individual images to be presented to each eye of the at least one user, based on the optical location of each eye of the at least one user; and generate an image to be presented to the at least one camera, based on the optical location of the at least one camera, wherein the multiscopic image is generated based further on the individual images to be presented to each eye of the at least one user and the image to be presented to the at least one camera.

A technical benefit of this implementation is that it yields a significant calibration accuracy. This is because the at least one processor generates the image to be presented to the at least one camera from a perspective of the at least one camera itself, which implicitly indicates a prediction of what the at least one camera should observe when the multiscopic image is displayed and the at least one image of the display area is captured by the at least one camera. In other words, the at least one processor defines a mapping between pixel-level light emission and the optical location of the at least one camera, thereby providing an inherent expectancy of visual content that should ideally be captured by the at least one camera. This expectancy strengthens the at least one processor's ability to analyse discrepancies between the at least one captured image and what was intended to be shown to the at least one camera. As a result, determination of the refined estimated value of the at least one parameter becomes highly reliable and accurate, as the multiscopic image is composed using the individual images to be presented to both eyes of the at least one user as well as the image to be presented to the at least one camera, ensuring that light rays emitted from specific region(s) of the display area are purposefully aligned to reach the optical location of the at least one camera. Overall, this potentially results in improved predictability of the at least one parameter of the multiscopic optical element, as the system enables in defining the at least one camera's intended visual input during multiscopic image rendering, rather than relying solely on post-capture image analysis.

Optionally, when generating the individual images to be presented to each eye, the at least one processor is configured to generate a first image from a perspective of an optical location of a first eye of the at least one user, and a second image from a perspective of an optical location of a second eye of the at least one user, by employing a three-dimensional (3D) model of a virtual environment. In this regard, the first image and the second image are virtual images representing at least one virtual object which is a part of the virtual environment. Similarly, optionally, when generating the image to be presented to the at least one camera, the at least one processor is configured to said image from a perspective of the optical location of the at least one camera, by employing the 3D model of the virtual environment. The step of generating the multiscopic image by utilising the individual images and said image can be performed using any suitable well-known technique.

Additionally, optionally, the at least one processor is further configured to:

determine a subspace of an image space of the multiscopic image that is not directed toward any eye of the at least one user during display, based on the initial estimated value of the at least one parameter and the optical location of each eye of the at least one user; and when generating the multiscopic image, utilise the determined subspace to present the image to the at least one camera, wherein the image to be presented to the at least one camera comprises at least one of: a predefined pattern, a spatio-temporal noise pattern.

This implementation is an enhancement for on-the-fly calibration by leveraging a portion of the image space (i.e., the subspace) of the multiscopic image that is not visible to any eye of the at least one user. This is because light from the subspace is not directed towards the at least one user, and thus can be repurposed to enhance calibration fidelity by directing said light towards the at least one camera. Beneficially, this may allow the system to gather calibration data from regions of the display area that are currently unused for user content, whilst maintaining a seamless visual experience for the user while calibration is ongoing. The subspace can be understood to be a linear region or a volumetric component of the image space of the multiscopic image, such that the light emitted from said subspace does not intersect with any user's eye position.

It will be appreciated that the subspace of the image space can be determined, for example, by applying geometric projection logic based on the initial estimated value of the at least one parameter and the known optical location of each eye of the at least one user. This is possible because the at least one parameter define how the multiscopic optical element maps light emanating from (underlying) pixels or subpixels of the multiscopic display to specific viewing directions (namely, optical locations). Using this mapping and the known optical location of each eye, the at least one processor can calculate which rays of light (i.e., directional components of the image space) will not intersect with any eye of the at least one user. These rays of light correspond to the subspace of the image space that is effectively invisible to the user. Once the subspace is determined, the at least one processor utilises said subspace for presenting the image to the at least one camera.

A technical benefit of adding the at least one of: the predefined pattern, the spatio-temporal noise pattern, in the image to be presented to the at least one camera lies in enhancing calibration quality without affecting user's visual experience. Since the subspace is not directed toward any eye of the user, embedding structured or noise-based patterns in the image introduces high-frequency visual features that are captured solely by the at least one camera. These high-frequency visual features significantly improve a signal-to-noise ratio for interference pattern analysis, thereby enabling precise and robust estimation of the refined estimated value of the at least one parameters, particularly, in display regions where user-facing content may lack sufficient texture or contrast for accurate measurement. The predefined pattern may include known high-frequency visual structures such as grids, stripes, or other repeating geometries. The spatio-temporal noise pattern can be any one of: a flickering white noise pattern, a temporally shifting stripes pattern, a dynamic Perlin noise pattern, a time-varying speckle pattern, a blue noise pattern, an oscillating dot matrix pattern. In some implementations, the spatio-temporal noise pattern is pre-known, allowing the at least one processor to accumulate calibration information over a plurality of multiscopic images for improved robustness. Further, a brightness of noise pixels may be adjusted to minimise perceptibility to the at least one user while maintaining detectability by the at least one camera, thereby balancing calibration accuracy with preservation of a visual experience of the at least one user.

One way of determining which pattern to use for modifying the determined subspace of the image space, based on current uncertainty in the at least one parameter, is described, for example, in "*Bayesian adaptive estimation: The next dimension*" by Janne V. Kujalaa, and Tuomas J. Lukka, published in Journal of Mathematical Psychology, Vol. 50, Issue 4, pp. 369-389, February 2006, which has been incorporated herein by reference.

Optionally, the multiscopic image comprises a spatio-temporal noise pattern. In this regard, an entirety of the multiscopic image has the spatio-temporal noise pattern. A technical benefit of this is that it enhances robustness and effectiveness of interference pattern analysis used in the calibration of the at least one parameter of the multiscopic optical element. This is because an inclusion of the spatio-temporal noise pattern ensures that the at least one captured image always contains considerable high-frequency visual features across time and space, even when an original visual content may be low in texture or visual detail (for example, having flat-coloured regions). By distributing noise over space and time, rather than having a single static pattern, the system avoids introducing perceptible visual artifacts to the at least one user, while still achieving spectral richness needed for accurate calibration. This approach enables continuous, background calibration without degrading the user's viewing experience, and ensures that the calibration remains effective under varying visual content and usage conditions.

For illustration purposes only, there will now be described how various components of the system can be implemented. The at least one processor controls an overall operation of the system. The at least one processor is communicably coupled to the tracker, the multiscopic display and the at least one camera. Optionally, the at least one processor is implemented as a processor of the multiscopic display. Alternatively, optionally, the at least one processor is implemented as a processor of a computing device that is communicably coupled to the multiscopic display. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

It will be appreciated that the system and the method can be implemented, for example, in a vehicle. The vehicle could, for example, be a car, a truck, an aircraft, a speed boat or the like. Optionally, in this regard, the multiscopic display is arranged on a dashboard of the vehicle, and the optical combiner is optionally implemented using a transparent portion of a windshield of the vehicle. It will be appreciated that there may be some cases where the multiscopic display may be arranged on a roof of the vehicle, but not on the dashboard of the vehicle. Similarly, the optical combiner may be implemented using a pull-down reflector or similar, but not using the windshield of the vehicle. In an example, when the system is implemented in the aircraft, the multiscopic display may be roof-mounted, and may be employed to display locations of other aircrafts that are in a vicinity of said aircraft.

Optionally, the tracker comprises at least one tracking camera to detect and/or track at least an optical position of the given eye of the given user. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a ToF camera, a LIDAR camera, an RGB-D camera, a laser rangefinder, a stereo camera, a plenoptic camera, a ranging camera, a SONAR camera.

Optionally, the at least one camera comprises at least one of: at least one visible-light camera, at least one infrared (IR) camera, at least one depth camera. Example implementations of all such types of cameras have been already discussed hereinabove.

In some implementations, the multiscopic display can be implemented as a light field display unit. Pursuant to embodiments of the present disclosure, different types of light field display units can be implemented. For example, the light field display unit can be any one of: a hogel-based light field display unit, a lenticular array-based light field display unit, a parallax barrier-based light field display unit. The light field display unit could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display. When the multiscopic display is implemented as a light field display unit, the multiscopic image is generated as a light field image.

Throughout the present disclosure, the term "multiscopic optical element" of the multiscopic display refers to a specialised optical element that is capable of directing light rays incident thereupon in different directions simultaneously. This allows the multiscopic optical element to present a multiscopic view to the given user without any need for her/him to wear 3D glasses. Optionally, the multiscopic optical element is implemented as any one of: a parallax barrier, a lenticular array. The multiscopic optical element can be static or actively controllable. The multiscopic optical element and its forms are well-known in the art. It will be appreciated that an alternative to the aforementioned conventional multiscopic optical element, the multiscopic display may comprise a specialised backlight unit comprising a first layer of lenticulars, a diffuser layer, and a second layer of lenticulars. The first layer of lenticulars focuses light emitted by an addressable light-emitting diode (LED) matrix, concentrating the light into near-singular light points on a subsequent diffuser layer. The diffuser layer is arranged to receive the focused light from the first layer of lenticulars, and serves as an emission surface for light points. The second layer of lenticulars directs the light emitted by the diffuser layer toward specific directions. A steering of the light's direction is achieved by selectively activating specific LEDs within the addressable LED matrix. By leveraging such a configuration, the specialised backlight unit produces steerable collimated light, which is then passed through a traditional LCD panel. The LCD panel is capable of generating a full-resolution colour image, while stereoscopy or multiscopy is realised via temporal multiplexing. The temporal multiplexing allows alternating image frames to be directed toward different eyes (for example, one image frame towards a left eye and a next image frame towards a right eye) of the user, thus enabling depth perception without relying on the conventional multiscopic optical elements. Such a specialised backlight unit is described, for example, in "*Modeling and optimizing through plenoptic function for the dual lenticular lens-based directional autostereoscopic display system*" by Xueling Li, Shengzhi Qiang, Yuanqing Wang, and Xicai Li, published in Optics Express, Vol. 32, Issue 7, pp. 10925-10940, 2024, which has been incorporated herein by reference.

The term "optical combiner" refers to a specialised equipment that is capable of reflecting light rays from the display area of the multiscopic display towards the given user, when the optical combiner is arranged on the optical path of the multiscopic display and on an optical path of a real-world light field of a real-world environment. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to an image plane of the multiscopic display lies in a range of 10 degrees to 75 degrees.

The present disclosure also relates to the method as described above. Various embodiments and variants disclosed above, with respect to the aforementioned first aspect, apply mutatis mutandis to the method.

Optionally, the method further comprises:
calculating at least one expected image of the display area that is expected to be captured by the at least one camera during display of the multiscopic image, based on the multiscopic image, the initial estimated value of the at least one parameter, the optical location of each eye of the at least one user, and the optical location of the at least one camera; and determining at least one interference pattern based on a difference between the at least one captured image and the at least one expected image of the display area,
wherein the refined estimated value of the at least one parameter of the multiscopic optical element is determined based further on the at least one interference pattern.

Additionally, optionally, the method further comprises:
for each of a plurality of multiscopic images that present virtual content across different regions of the display area,
determining the optical location of each eye of the at least one user;
generating each of the plurality of multiscopic images based on the optical location of each eye of the at least one user and the initial estimated value of the at least one parameter;
displaying each of the plurality of multiscopic images via the multiscopic display, whilst capturing at least one corresponding image of the display area using the at least one camera;
calculating at least one corresponding expected image of the display area; and
determining at least one corresponding interference pattern based on a difference between the at least one corresponding captured image and the at least one corresponding expected image of the display area; and
accumulating a multi-image interference pattern based on respective interference patterns corresponding to the plurality of multiscopic images,
wherein the refined estimated value of the at least one parameter of the multiscopic optical element is determined based further on the multi-image interference pattern.

Optionally, in the method, the at least one camera is positioned such that a region of the display area lies within the field of view of the at least one camera both directly and via reflection from an optical combiner that is arranged on an optical path of the multiscopic display,
wherein the step of calculating the at least one expected image of the display area comprises calculating a first expected image and a second expected image of the display area corresponding respectively to a direct view and a reflected view of the display area, wherein the at least one expected image comprises the first expected image and the second expected image, and
wherein the step of determining the at least one interference pattern comprises:
extracting a first image segment of the at least one captured image representing a direct view of the region of the display area;
extracting a second image segment of the at least one captured image representing a reflected view of the region of the display area;
determining a first interference pattern based on a difference between the first image segment of the at least one captured image and a corresponding image segment of the first expected image of the display area; and
determining a second interference pattern based on a difference between the second image segment of the at least one captured image and a corresponding image segment of the second expected image of the display area;
wherein the at least one interference pattern comprises the first interference pattern and the second interference pattern.

Optionally, in the method, the at least one parameter comprises a pitch of the multiscopic optical element, wherein the step of determining the refined estimated value of the at least one parameter comprises:

determining a frequency of an interference beat in the at least one interference pattern; and determining a refined estimated value of the pitch based on an initial estimated value of the pitch and the frequency of the interference beat.

Optionally, in the method, the at least one parameter comprises a phase of the multiscopic optical element, wherein the step of determining the refined estimated value of the at least one parameter comprises:

selecting an interference beat in the at least one interference pattern that corresponds to a point in the at least one captured image closest to an origin of the at least one captured image;

retrieving a colour value of a group of neighbouring pixels, from the at least one expected image, at a location corresponding to the selected interference beat;

determining a distance between an origin of the at least one interference pattern corresponding to the origin of the at least one captured image and a centre of a first part of the selected interference beat having the retrieved colour value; and determining a refined estimated value of the phase based on an initial estimated value of the phase and the determined distance.

Optionally, in the method, the at least one parameter comprises an orientation of the multiscopic optical element, wherein the step of determining the refined estimated value of the at least one parameter comprises:

determining a beat orientation in the at least one interference pattern; and determining a refined estimated value of the orientation based on an initial estimated value of the orientation and the determined beat orientation.

Additionally, optionally, in the method, the step of determining the refined estimated value of the orientation comprises ruling out a wrong one out of two alternative directions in which the initial estimated value of the orientation is to be rotated to reach the refined estimated value of the orientation, by:

repeating the step of selecting the initial estimated value of the orientation, the step of generating the multiscopic image, the step of displaying the multiscopic image, the step of capturing the at least one image of the display area, the step of calculating the at least one expected image, the step of determining the at least one interference pattern, and the step of determining the beat orientation, using different initial estimated values of the orientation;

detecting a change in the beat orientation; and adjusting the different initial estimated values of the orientation in a direction that is opposite to a direction of the detected change in the beat orientation.

Optionally, in the method, the at least one parameter further comprises a pitch of the multiscopic optical element, wherein the step determining the refined estimated value of the at least one parameter comprises:

detecting when an accuracy of an initial estimated value of the pitch with respect to a refined estimated value of the pitch is less than an accuracy of the initial estimated value of the orientation with respect to the refined estimated value of the orientation; and when the accuracy of the initial estimated value of the pitch is less than the accuracy of the initial estimated value of the orientation, repeating the step of selecting the initial estimated value of the pitch, the step of selecting the initial estimated value of the orientation, the step of generating the multiscopic image, the step of displaying the multiscopic image, the step of capturing the at least one image of the display area, the step of calculating the at least one expected image, the step of determining the at least one interference pattern, and the step of determining the beat orientation, using different initial estimated values of the pitch and a same initial estimated value of the orientation;

detecting another change in the beat orientation; and adjusting the different initial estimated values of the pitch in a direction that is opposite to a direction of the another change in the beat orientation.

Optionally, in the method, the at least one parameter comprises a thickness of the multiscopic optical element, wherein the step of determining the refined estimated value of the at least one parameter comprises:

determining a first frequency of interference beats in the at least one interference pattern that correspond to a region toward an edge of the display area, and a second frequency of interference beats in the at least one interference pattern that correspond to a region toward a centre of the display area;

determining a difference between the first frequency and the second frequency; and determining a refined estimated value of the thickness based on an initial estimated value of the thickness and the determined difference.

Optionally, the method further comprises:

generating individual images to be presented to each eye of the at least one user, based on the optical location of each eye of the at least one user; and generating an image to be presented to the at least one camera, based on the optical location of the at least one camera, wherein the multiscopic image is generated based further on the individual images to be presented to each eye of the at least one user and the image to be presented to the at least one camera.

Additionally, optionally, the method further comprises:

determining a subspace of an image space of the multiscopic image that is not directed toward any eye of the at least one user during display, based on the initial estimated value of the at least one parameter and the optical location of each eye of the at least one user; and when generating the multiscopic image, utilising the determined subspace to present the image to the at least one camera, wherein the image to be presented to the at least one camera comprises at least one of: a predefined pattern, a spatio-temporal noise pattern.

Optionally, in the method, the multiscopic image comprises a spatio-temporal noise pattern.

DETAILED DESCRIPTION OF THE DRAWINGS

Referring to FIG. 1, illustrated is a simplified example implementation of a system 100 for on-the-fly automated calibration of a multiscopic display 102, in accordance with an embodiment of the present disclosure. The system 100 is shown to be implemented, for example, in a vehicle 104. The vehicle 104 could, for example, be a car, a truck, an aircraft, a speed boat or the like. The system 100 comprises the multiscopic display 102, at least one camera (for example, depicted as a camera 106), at least one processor (for example, depicted as a processor 108), and a tracker 110. The camera 106 is shown to be positioned in a manner that a display area 112 of the multiscopic display 102 lies at least partially within a field of view of the camera 106. A user 114 is shown to be seated on a seat 116 of the vehicle 104. Optionally, the system 100 further comprises an optical combiner 118. The optical combiner 118 is shown to be arranged on an optical path of the multiscopic display 102. Optionally, in this regard, the optical combiner 118 is integrated into a windshield (not shown) of the vehicle 104. The tracker 110 is shown to be implemented, for example, as a tracking camera. It is to be noted that FIG. 1 shows a side view of the vehicle 104, for sake of simplicity only. Due to this, the display area 112 of the multiscopic display 102 and the optical combiner 118 are shown from a side. In reality, from a perspective of a pose of the camera 106, the display area 112 and the optical combiner 118 will appear as two-dimensional surfaces only. The processor 108 is configured to perform various operations, as described earlier with respect to the aforementioned first aspect.

It may be understood by a person skilled in the art that FIG. 1 includes a simplified example implementation of the system 100, for sake of clarity, which should not unduly limit the scope of the claims herein. It is to be understood that the specific implementation of the system 100 is provided as an example and is not to be construed as limiting it to specific numbers or types of multiscopic displays, cameras, trackers, optical combiners, and processors. The person skilled in the art will recognize many variations, alternatives, and modifications of embodiments of the present disclosure.

Figure 2:
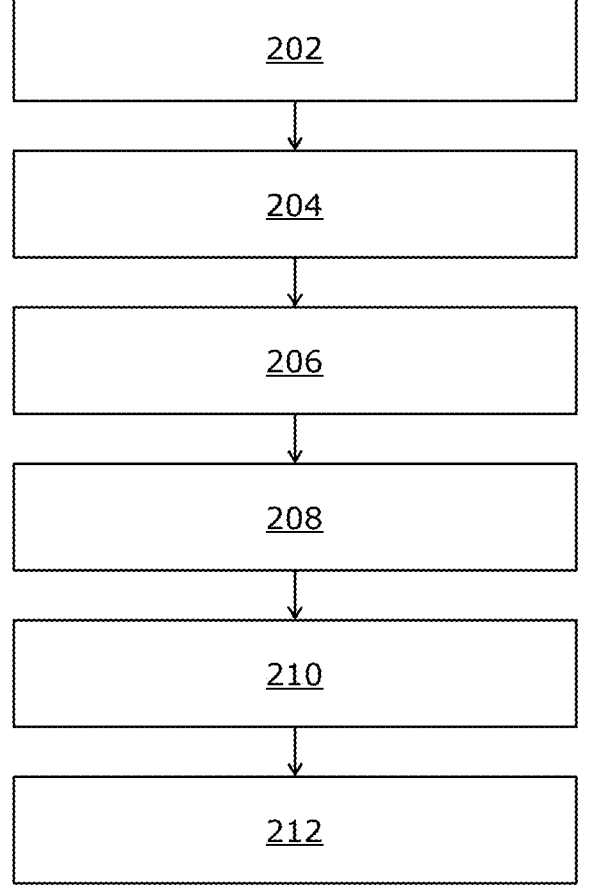
FIG. 2 illustrates steps of a method for on-the-fly automated calibration of a multiscopic display, in accordance with an embodiment of the present disclosure.

Referring to FIG. 2, illustrated are steps of a method for on-the-fly automated calibration of a multiscopic display, in accordance with an embodiment of the present disclosure. At step 202, an optical location of each eye of at least one user relative to the display area, is determined, using a tracker. At step 204, an optical location of at least one camera relative to a display area of a multiscopic display, is determined or retrieved, wherein the at least one camera is positioned such that the display area at least partially within a field of view of the at least one camera. At step 206, an initial estimated value of at least one parameter of a multiscopic optical element of the multiscopic display, is selected. At step 208, a multiscopic image to be displayed via the multiscopic display, is generated, based on the initial estimated value of the at least one parameter and the optical location of each eye of the at least one user. At step 210, the multiscopic image is displayed via the multiscopic display, whilst at least one image of the display area is captured using the at least one camera. At step 212, a refined estimated value of the at least one parameter of the multiscopic optical element, is determined, based on the at least one captured image, the multiscopic image, the initial estimated value of the at least one parameter, and the optical location of the at least one camera.

The aforementioned steps are only illustrative and other alternatives can also be provided where one or more steps are added, one or more steps are removed, or one or more steps are provided in a different sequence without departing from the scope of the claims.

Figure 3A:
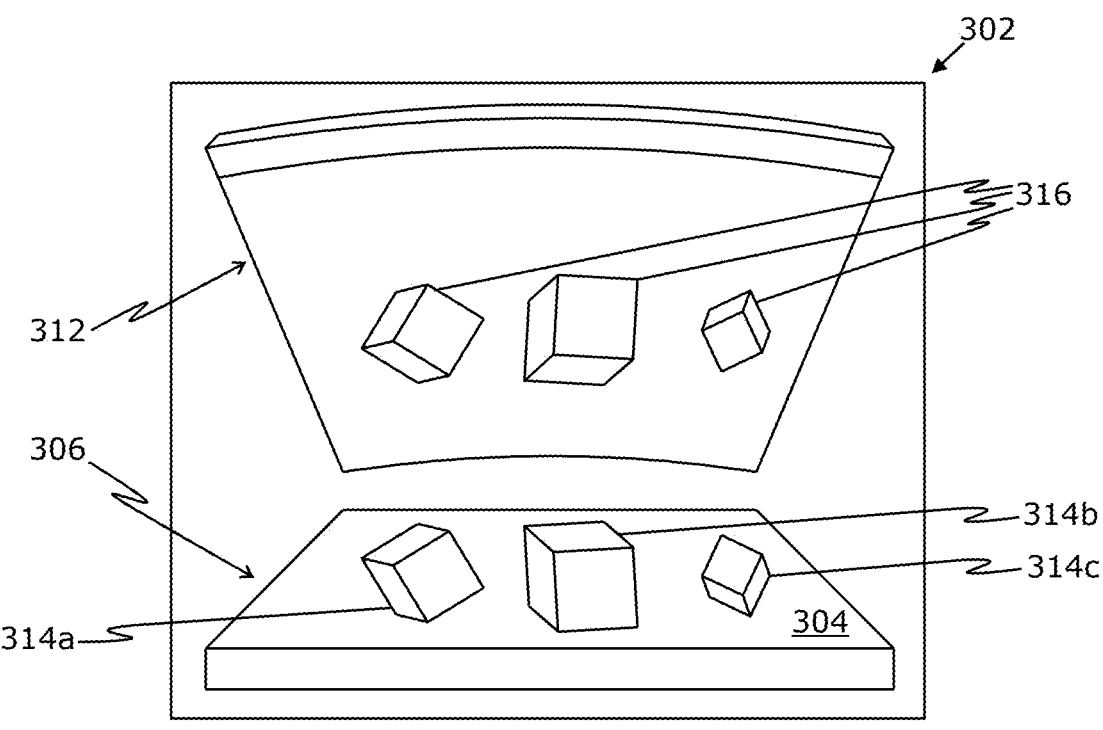
FIG. 3A illustrates a simplified example of an expected image of a display area of a multiscopic display.
Figure 3B:
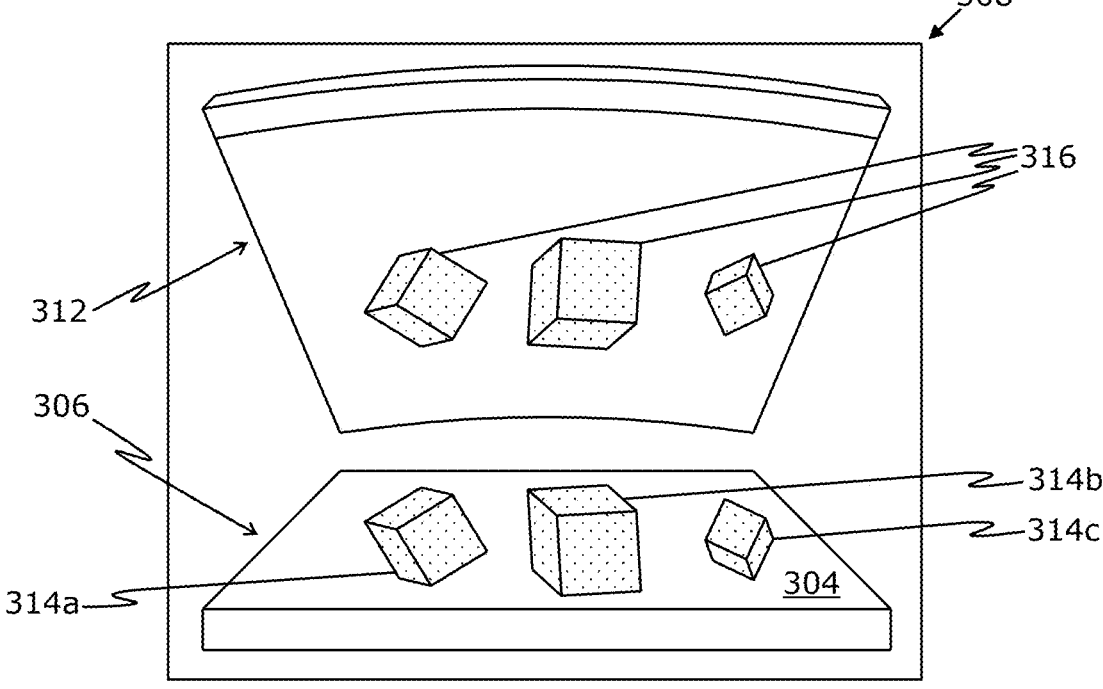
FIG. 3B illustrates a simplified example of an image of the display area captured by at least one camera.
Figure 3C:
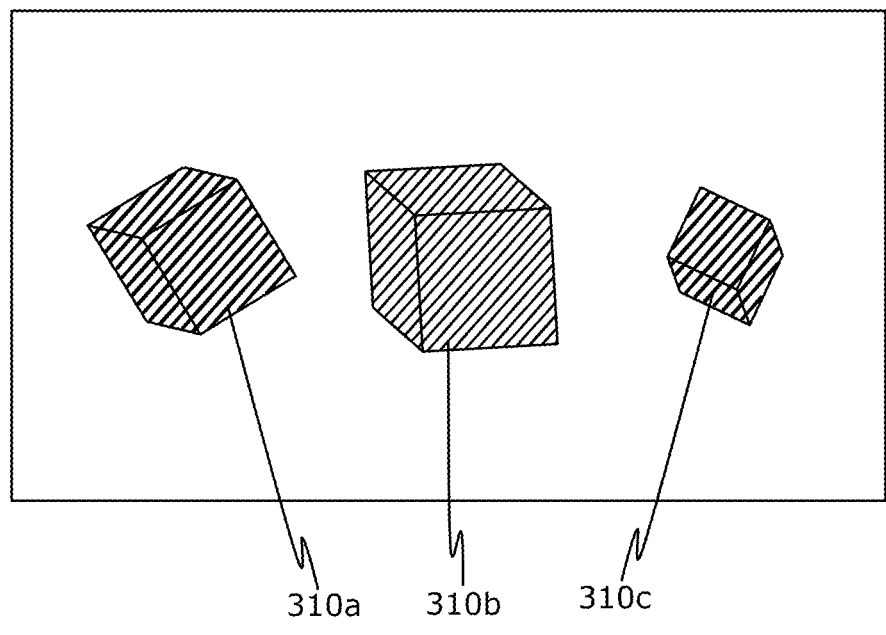
Figure 3D:
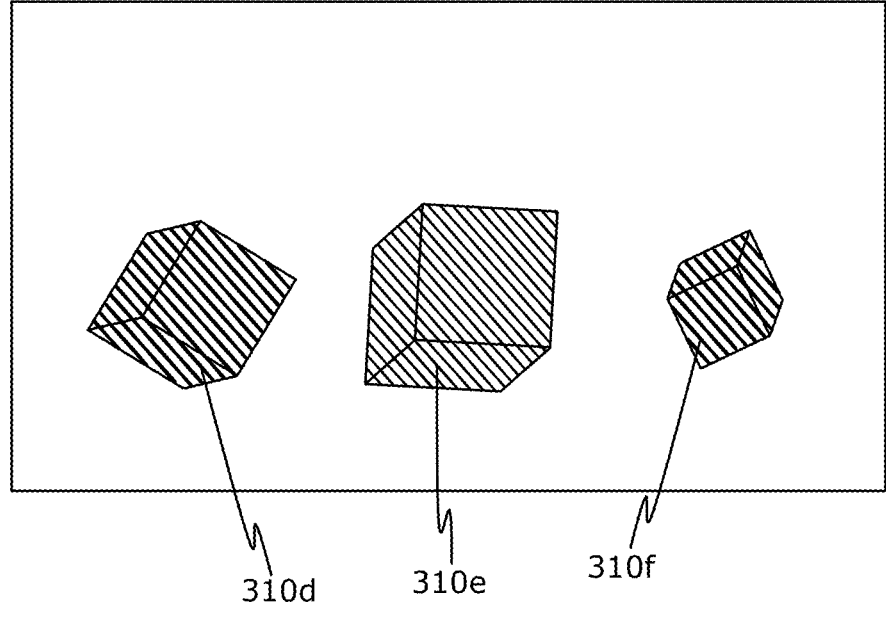
FIG. 3D illustrates simplified examples of interference patterns generated corresponding to a reflected view of the display area, in accordance with an embodiment of the present disclosure.

Referring to FIGS. 3A, 3B, 3C, and 3D, FIG. 3A illustrates a simplified example of an expected image 302 of a display area 304 of a multiscopic display 306, FIG. 3B illustrates a simplified example of an image 308 of the display area 304 captured by at least one camera (not shown), FIG. 3C illustrates simplified examples of interference patterns 310a, 310b, and 310c generated corresponding to a direct view of the display area 304, while FIG. 3D illustrates simplified examples of interference patterns 310d, 310e, and 310f generated corresponding to a reflected view of the display area 304, in accordance with an embodiment of the present disclosure.

With reference to FIG. 3A, the expected image 302 of the display area 304 is an image that is expected to be captured by the at least one camera during display of a multiscopic image. The expected image 302 is calculated, based on the multiscopic image, an initial estimated value of at least one parameter (for example, such as a pitch, an orientation, a thickness, and/or a phase) of a multiscopic optical element (not shown) of the multiscopic display 306, an optical location of each eye of at least one user, and an optical location of the at least one camera. The expected image 302 is shown to correspond to both the direct view and the reflected view of the display area 304. The direct view of the display area 304 is a view of the display area 304 that directly lies within a field of view of the at least one camera. On the other hand, the reflected view of the display area 304 is a view of the display area 304 that lies within the field of view of the at least one camera via a reflection from an optical combiner 312 that is arranged on an optical path of the multiscopic display 306.

With reference to FIG. 3B, the captured image 308 of the display area 304 is an image that is actually captured by the at least one camera from a perspective of the optical location of the at least one camera. The captured image 308 is shown to represent both the direct view and the reflected view of the display area 304.

With reference to FIGS. 3A and 3B, for sake of simplicity and clarity, the expected image 302 and the captured image 308 represent three objects 314a, 314b, and 314c being displayed at the display area 304, and reflections 316 of the three objects 314a, 314b, and 314c via the optical combiner 312. The three objects 314a, 314b, and 314c appear mirrored in the reflected view of the display area 304 via the optical combiner 312. It will be appreciated that since the initial estimated value of at least one parameter is considerably different from an actual value of the at least one parameter, the three objects 314a, 314b, and 314c represented in FIG. 3B are slightly differently captured by the at least one camera (and thus, they are represented using dotted patterns, for sake of convenience), as compared to how the three objects 314a, 314b, and 314c are represented in the expected image 302. In other words, the dotted patterns are only used to make a distinction that the three objects 314a, 314b, and 314c represented in the expected image 302 (in FIG. 3A) are slightly differently captured in the captured image 308 (in FIG. 3B).

With reference to FIG. 3C, the interference patterns 310a, 310b, and 310c (depicted using diagonal stripes pattern) correspond to the direct view of the display area 304. The interference patterns 310a, 310b, and 310c correspond to the three objects 314a, 314b, and 314c (as shown in FIGS. 3A and 3B), respectively. The interference patterns 310a, 310b, and 310c are generated based on a difference between a first image segment of the captured image 308 and a corresponding image segment of the expected image 302 of the display area 304, wherein the first image segment of the captured image 308 represents the direct view of the display area 304, and wherein the corresponding image segment of the expected image 302 corresponds to the direct view of the display area 304. For sake of clarity, the interference patterns 310a, 310b, and 310c can be understood to be first interference patterns.

With reference to FIG. 3D, the interference patterns 310d, 310e, and 310f (depicted using diagonal stripes pattern) correspond to the reflected view of the display area 304. The interference patterns 310d, 310e, and 310f correspond to reflections 316 of the three objects 314a, 314b, and 314c (as shown in FIG. 3B), respectively. The interference patterns 310d, 310e, and 310f are generated based on a difference between a second image segment of the captured image 308 and a corresponding image segment of the expected image 302 of the display area 304, wherein the second image segment of the captured image 308 represents the reflected view of the display area 304, and wherein the corresponding image segment of the expected image 302 corresponds to the reflected view of the display area 304. For sake of clarity, the interference patterns 310d, 310e, and 310f can be understood to be second interference patterns.

With reference to FIGS. 3C and 3D, it will be appreciated that, for sake of clarity and convenience, the interference patterns 310a, 310b, 310c, 310d, 310e, and 310f are shown to be generated on surfaces of the three objects 314a, 314b, and 314c, and thus boundaries of the three objects 314a, 314b, and 314c are shown in FIGS. 3C and 3D.

Figure 4:
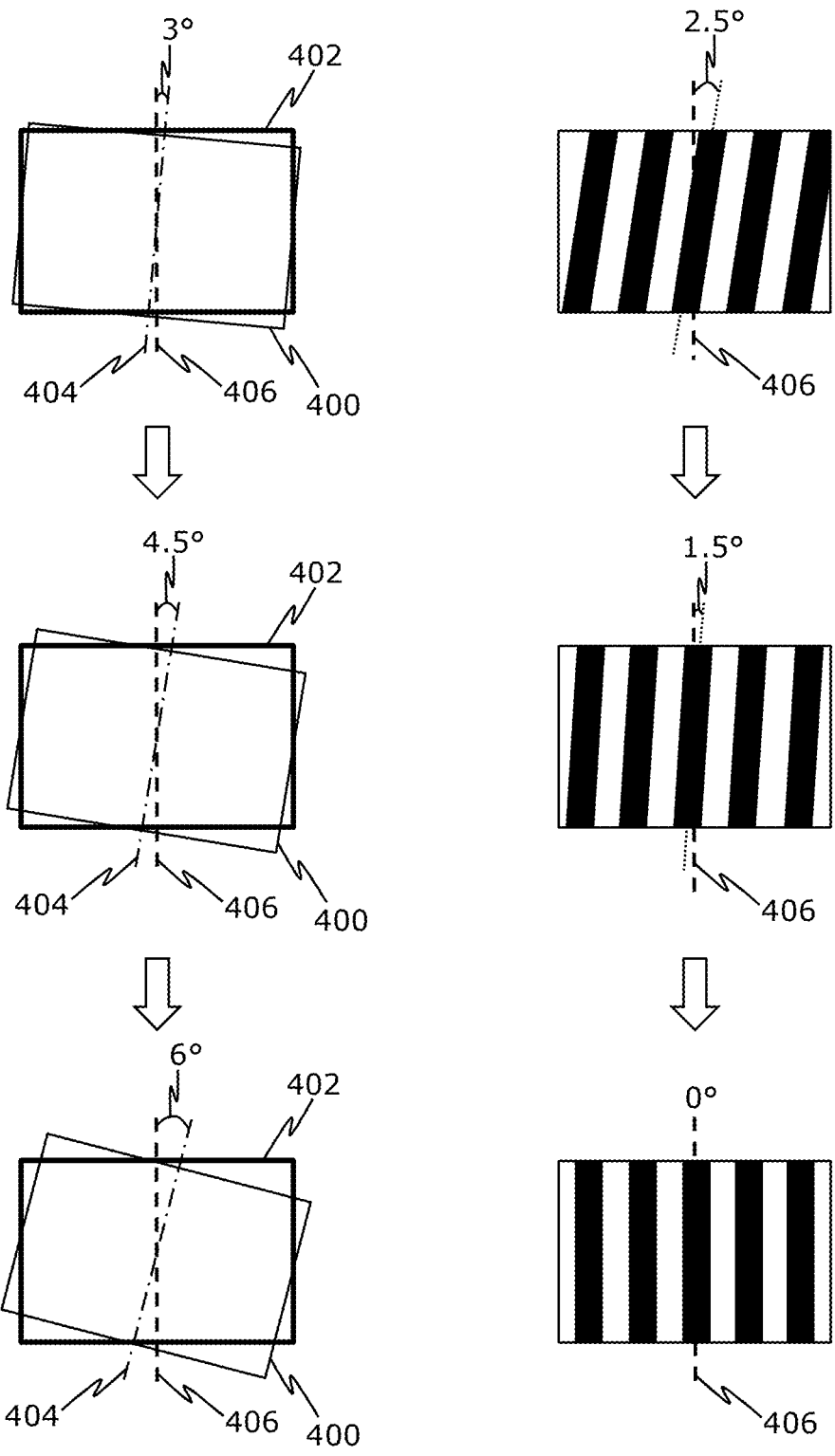
FIG. 4 illustrates an exemplary scenario of iteratively adjusting values of an initial estimated value of an orientation of a multiscopic optical element of a multiscopic display, in accordance with an embodiment of the present disclosure.

Referring to FIG. 4, illustrated is an exemplary scenario of iteratively adjusting values of an initial estimated value of an orientation of a multiscopic optical element 400 of a multiscopic display, in accordance with an embodiment of the present disclosure. For each iteration, there are shown initial estimated values of the orientation of the multiscopic optical element 400 with respect to a pixel array 402 of the multiscopic display, and a portion of a corresponding interference pattern resulting from each individual initial estimated value of the orientation, said portion of the corresponding interference pattern having a given beat orientation. The corresponding interference pattern is determined based on a difference between at least one image of a display area of the multiscopic display captured by at least one camera, and at least one expected image of the display area that is expected to be captured by the at least one camera during display of a multiscopic image, the multiscopic image being generated based on a given initial estimated value of a pitch of the multiscopic optical element 400.

Any orientation of the multiscopic optical element 400 is a rotational alignment of the multiscopic optical element 400 with respect to the pixel array 402. In other words, the orientation is a rotation of a longitudinal axis 404 (depicted using a dash-dot line) of the multiscopic optical element 400 with respect to a longitudinal axis 406 (depicted using a dashed line) of the pixel array 402, specifically, about a Z-axis (namely, a depth axis) of the multiscopic display. In a typical implementation, the longitudinal axis 404 of the multiscopic optical element 400 is slightly angularly aligned with respect to the longitudinal axis 406 of the pixel array 402, for minimising visual artifacts (for example, such as aliasing effects or colour fringing). Such an angle between the longitudinal axis 404 and the longitudinal axis 406 corresponds to an orientation of the multiscopic optical element 400 with respect to the pixel array 402. In a case where with each iteration, the beat orientation in said portion of the interference pattern is moving closer towards the angle between the longitudinal axis 404 and the longitudinal axis 406, it indicates that a direction (any of a clockwise direction and a counter-clockwise direction) in which the initial estimated value of the orientation is being rotated, is correct.

As shown, when different initial estimated values of the orientation are used in a sequence: 9.5 degrees, 8 degrees, 6 degrees, in a counter-clockwise direction (from an initial estimated value of the orientation as 0 degree), a beat orientation in a portion of corresponding interference patterns is changed (from an initial beat orientation of 10 degrees) in a sequence: 8 degrees, 7.4 degrees, 6 degrees, respectively. It can be observed that initial estimated values of the orientation that are greater than 6 degrees result in an increase in the beat orientation; but the initial estimated value of 6 degrees results in a value of the beat orientation that is similar to the initial estimated value of 6 degrees. Therefore, the initial estimated value of 6 degrees (for which a corresponding beat orientation is 6 degrees) can be determined as the refined estimated value of the orientation. For sake of clarity and better understanding only, angles for the initial estimated value of the orientation and the beat orientation are exaggeratedly shown in FIG. 4 and are not drawn to scale.

Figure 5:
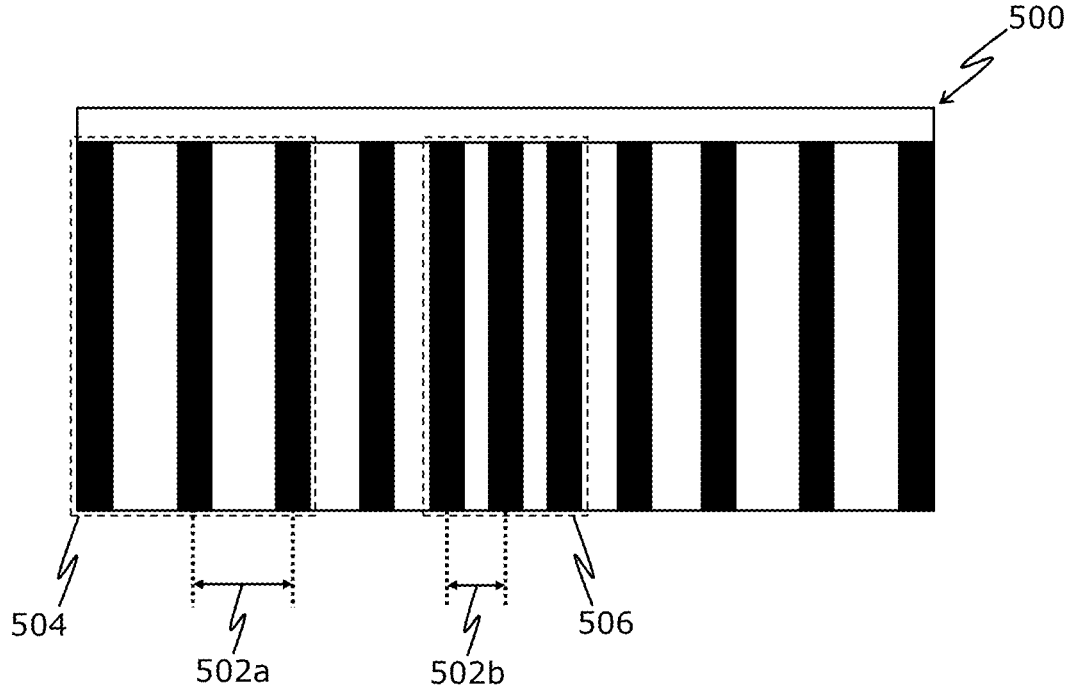
FIG. 5 illustrates an exemplary scenario of how a refined estimated value of a thickness of a multiscopic optical element of a multiscopic display is determined, in accordance with an embodiment of the present disclosure.

Referring to FIG. 5, illustrated is an exemplary scenario of how a refined estimated value of a thickness of a multiscopic optical element of a multiscopic display (not shown) is determined, in accordance with an embodiment of the present disclosure. For sake of simplicity, there is shown a portion of an interference pattern 500 that is determined based on a difference between at least one image of a display area of the multiscopic display captured by at least one camera, and at least one expected image of the display area that is expected to be captured by the at least one camera during display of a multiscopic image, the multiscopic image being generated based on an initial estimated value of a thickness of the multiscopic optical element. Using said portion of the interference pattern 500, at least one processor can determine a difference between a first frequency (i.e., a reciprocal of a first wavelength 502a) of interference beats 504 in said portion of the interference pattern 500 that correspond to a region toward an edge of the display area, and a second frequency (i.e., a reciprocal of a second wavelength 502b) of interference beats 506 in said portion of the interference pattern 500 that correspond to a region at a centre of the display area. Then, the at least one processor can determine the refined estimated value of the thickness of the multiscopic optical element, based on the initial estimated value of the thickness and the difference between the first frequency and the second frequency.

FIGS. 3A, 3B, 3C, 3D, 4, and 5 are merely examples, which should not unduly limit the scope of the claims herein. A person skilled in the art will recognize many variations, alternatives, and modifications of embodiments of the present disclosure.

The invention claimed is:

1. A system comprising:
a tracker;
a multiscopic display;
at least one camera that is positioned such that a display area of the multiscopic display lies at least partially within a field of view of the at least one camera; and
at least one processor configured to:
determine an optical location of each eye of at least one user relative to the display area, using the tracker;
determine or retrieve an optical location of the at least one camera relative to the display area;

select an initial estimated value of at least one parameter of a multiscopic optical element of the multiscopic display;

generate a multiscopic image to be displayed via the multiscopic display, based on the initial estimated value of the at least one parameter and the optical location of each eye of the at least one user;

display the multiscopic image via the multiscopic display, whilst capturing at least one image of the display area using the at least one camera; and determine a refined estimated value of the at least one parameter of the multiscopic optical element, based on the at least one captured image, the multiscopic image, the initial estimated value of the at least one parameter, and the optical location of the at least one camera.

2. The system of claim 1, wherein the at least one processor is configured to:

calculate at least one expected image of the display area that is expected to be captured by the at least one camera during display of the multiscopic image, based on the multiscopic image, the initial estimated value of the at least one parameter, the optical location of each eye of the at least one user, and the optical location of the at least one camera; and determine at least one interference pattern based on a difference between the at least one captured image and the at least one expected image of the display area, wherein the refined estimated value of the at least one parameter of the multiscopic optical element is determined based further on the at least one interference pattern.

3. The system of claim 2, wherein the at least one processor is configured to:

for each of a plurality of multiscopic images that present virtual content across different regions of the display area, determine the optical location of each eye of the at least one user;

generate each of the plurality of multiscopic images based on the optical location of each eye of the at least one user and the initial estimated value of the at least one parameter;

display each of the plurality of multiscopic images via the multiscopic display, whilst capturing at least one corresponding image of the display area using the at least one camera;

calculate at least one corresponding expected image of the display area; and determine at least one corresponding interference pattern based on a difference between the at least one corresponding captured image and the at least one corresponding expected image of the display area; and accumulate a multi-image interference pattern based on respective interference patterns corresponding to the plurality of multiscopic images, wherein the refined estimated value of the at least one parameter of the multiscopic optical element is determined based further on the multi-image interference pattern.

4. The system of claim 2, further comprising an optical combiner arranged on an optical path of the multiscopic display, wherein the at least one camera is positioned such that a region of the display area lies within the field of view of the at least one camera both directly and via reflection from the optical combiner, wherein when calculating the at least one expected image of the display area, the at least one processor is configured to calculate a first expected image and a second expected image of the display area corresponding respectively to a direct view and a reflected view of the display area, wherein the at least one expected image comprises the first expected image and the second expected image, and wherein when determining the at least one interference pattern, the at least one processor is configured to:

extract a first image segment of the at least one captured image representing a direct view of the region of the display area;

extract a second image segment of the at least one captured image representing a reflected view of the region of the display area;

determine a first interference pattern based on a difference between the first image segment of the at least one captured image and a corresponding image segment of the first expected image of the display area; and determine a second interference pattern based on a difference between the second image segment of the at least one captured image and a corresponding image segment of the second expected image of the display area;

wherein the at least one interference pattern comprises the first interference pattern and the second interference pattern.

5. The system of claim 2, wherein the at least one parameter comprises a pitch of the multiscopic optical element, and wherein when determining the refined estimated value of the at least one parameter, the at least one processor is configured to:

determine a frequency of an interference beat in the at least one interference pattern; and determine a refined estimated value of the pitch based on an initial estimated value of the pitch and the frequency of the interference beat.

6. The system of claim 2, wherein the at least one parameter comprises a phase of the multiscopic optical element, and wherein when determining the refined estimated value of the at least one parameter, the at least one processor is configured to:

select an interference beat in the at least one interference pattern that corresponds to a point in the at least one captured image closest to an origin of the at least one captured image;

retrieve a colour value of a group of neighbouring pixels, from the at least one expected image, at a location corresponding to the selected interference beat;

determine a distance between an origin of the at least one interference pattern corresponding to the origin of the at least one captured image and a centre of a first part of the selected interference beat having the retrieved colour value;

determine a refined estimated value of the phase based on an initial estimated value of the phase and the determined distance.

7. The system of claim 2, wherein the at least one parameter comprises an orientation of the multiscopic optical element, and wherein when determining the refined estimated value of the at least one parameter, the at least one processor is configured to:

determine a beat orientation in the at least one interference pattern; and determine a refined estimated value of the orientation based on an initial estimated value of the orientation and the determined beat orientation.

8. The system of claim 7, wherein when determining the refined estimated value of the orientation, the at least one processor is configured to rule out a wrong one out of two alternative directions in which the initial estimated value of the orientation is to be rotated to reach the refined estimated value of the orientation, by:

repeating the step of selecting the initial estimated value of the orientation, the step of generating the multiscopic image, the step of displaying the multiscopic image, the step of capturing the at least one image of the display area, the step of calculating the at least one expected image, the step of determining the at least one interference pattern, and the step of determining the beat orientation, using different initial estimated values of the orientation;

detecting a change in the beat orientation; and adjusting the different initial estimated values of the orientation in a direction that is opposite to a direction of the detected change in the beat orientation.

9. The system of claim 7, wherein the at least one parameter further comprises a pitch of the multiscopic optical element, and wherein when determining the refined estimated value of the at least one parameter, the at least one processor is configured to:

detect when an accuracy of an initial estimated value of the pitch with respect to a refined estimated value of the pitch is less than an accuracy of the initial estimated value of the orientation with respect to the refined estimated value of the orientation; and when the accuracy of the initial estimated value of the pitch is less than the accuracy of the initial estimated value of the orientation, repeat the step of selecting the initial estimated value of the pitch, the step of selecting the initial estimated value of the orientation, the step of generating the multiscopic image, the step of displaying the multiscopic image, the step of capturing the at least one image of the display area, the step of calculating the at least one expected image, the step of determining the at least one interference pattern, and the step of determining the beat orientation, using different initial estimated values of the pitch and a same initial estimated value of the orientation;

detect another change in the beat orientation; and adjust the different initial estimated values of the pitch in a direction that is opposite to a direction of the another change in the beat orientation.

10. The system of claim 2, wherein the at least one parameter comprises a thickness of the multiscopic optical element, and wherein when determining the refined estimated value of the at least one parameter, the at least one processor is configured to:

determine a first frequency of interference beats in the at least one interference pattern that correspond to a region toward an edge of the display area, and a second frequency of interference beats in the at least one interference pattern that correspond to a region toward a centre of the display area;

determine a difference between the first frequency and the second frequency; and determine a refined estimated value of the thickness based on an initial estimated value of the thickness and the determined difference.

11. The system of claim 1, wherein the at least one processor is configured to:

generate individual images to be presented to each eye of the at least one user, based on the optical location of each eye of the at least one user; and generate an image to be presented to the at least one camera, based on the optical location of the at least one camera, wherein the multiscopic image is generated based further on the individual images to be presented to each eye of the at least one user and the image to be presented to the at least one camera.

12. The system of claim 11, wherein the at least one processor is further configured to:

determine a subspace of an image space of the multiscopic image that is not directed toward any eye of the at least one user during display, based on the initial estimated value of the at least one parameter and the optical location of each eye of the at least one user; and when generating the multiscopic image, utilise the determined subspace to present the image to the at least one camera, wherein the image to be presented to the at least one camera comprises at least one of: a predefined pattern, a spatio-temporal noise pattern.

13. The system of claim 1, wherein the multiscopic image comprises a spatio-temporal noise pattern.

14. A method comprising:

determining an optical location of each eye of at least one user relative to a display area of a multiscopic display, using a tracker;

determining or retrieving an optical location of at least one camera relative to the display area, wherein the at least one camera is positioned such that the display area at least partially within a field of view of the at least one camera;

selecting an initial estimated value of at least one parameter of a multiscopic optical element of the multiscopic display;

generating a multiscopic image to be displayed via the multiscopic display, based on the initial estimated value of the at least one parameter and the optical location of each eye of the at least one user;

displaying the multiscopic image via the multiscopic display, whilst capturing at least one image of the display area using the at least one camera; and determining a refined estimated value of the at least one parameter of the multiscopic optical element, based on the at least one captured image, the multiscopic image, the initial estimated value of the at least one parameter, and the optical location of the at least one camera.

15. The method of claim 14, further comprising:

calculating at least one expected image of the display area that is expected to be captured by the at least one camera during display of the multiscopic image, based on the multiscopic image, the initial estimated value of the at least one parameter, the optical location of each eye of the at least one user, and the optical location of the at least one camera; and determining at least one interference pattern based on a difference between the at least one captured image and the at least one expected image of the display area, wherein the refined estimated value of the at least one parameter of the multiscopic optical element is determined based further on the at least one interference pattern.

16. The method of claim 15, further comprising:

for each of a plurality of multiscopic images that present virtual content across different regions of the display area, determining the optical location of each eye of the at least one user;

generating each of the plurality of multiscopic images based on the optical location of each eye of the at least one user and the initial estimated value of the at least one parameter;

displaying each of the plurality of multiscopic images via the multiscopic display, whilst capturing at least one corresponding image of the display area using the at least one camera;

calculating at least one corresponding expected image of the display area; and determining at least one corresponding interference pattern based on a difference between the at least one corresponding captured image and the at least one corresponding expected image of the display area; and accumulating a multi-image interference pattern based on respective interference patterns corresponding to the plurality of multiscopic images, wherein the refined estimated value of the at least one parameter of the multiscopic optical element is determined based further on the multi-image interference pattern.

17. The method of claim 15, wherein the at least one camera is positioned such that a region of the display area lies within the field of view of the at least one camera both directly and via reflection from an optical combiner that is arranged on an optical path of the multiscopic display, wherein the step of calculating the at least one expected image of the display area comprises calculating a first expected image and a second expected image of the display area corresponding respectively to a direct view and a reflected view of the display area, wherein the at least one expected image comprises the first expected image and the second expected image, and wherein the step of determining the at least one interference pattern comprises:

extracting a first image segment of the at least one captured image representing a direct view of the region of the display area;

extracting a second image segment of the at least one captured image representing a reflected view of the region of the display area;

determining a first interference pattern based on a difference between the first image segment of the at least one captured image and a corresponding image segment of the first expected image of the display area; and determining a second interference pattern based on a difference between the second image segment of the at least one captured image and a corresponding image segment of the second expected image of the display area;

wherein the at least one interference pattern comprises the first interference pattern and the second interference pattern.

* * * * *